US011360446B2

(12) United States Patent
Pavaskar et al.

(10) Patent No.: US 11,360,446 B2
(45) Date of Patent: Jun. 14, 2022

(54) AVIONICS NETWORKS

(71) Applicants: Airbus Operations Limited, Bristol (GB); Airbus Operations SAS, Toulouse (FR)

(72) Inventors: Anand Pavaskar, Bristol (GB); Romain Desautard, Bristol (GB); Kayvon Barad, Bristol (GB); Sylvain Sauvant, Toulouse (FR); Juan Lopez, Toulouse (FR); Emilie Claudel, Toulouse (FR)

(73) Assignees: Airbus Operations Limited, Bristol (GB); Airbus Operations SAS, Toulouse (FR)

( * ) Notice: Subject to any disclaimer, the term of this patent is extended or adjusted under 35 U.S.C. 154(b) by 331 days.

(21) Appl. No.: 16/431,252

(22) Filed: Jun. 4, 2019

(65) Prior Publication Data
US 2019/0302715 A1     Oct. 3, 2019

Related U.S. Application Data

(63) Continuation of application No. 14/950,745, filed on Nov. 24, 2015, now Pat. No. 10,331,096.

(30) Foreign Application Priority Data

Nov. 27, 2014    (GB) .................................... 1421107

(51) Int. Cl.
*G05B 15/02*    (2006.01)
*B64C 19/00*    (2006.01)
(Continued)

(52) U.S. Cl.
CPC .............. *G05B 15/02* (2013.01); *B64C 19/00* (2013.01); *B64D 45/00* (2013.01);
(Continued)

(58) Field of Classification Search
None
See application file for complete search history.

(56) References Cited

U.S. PATENT DOCUMENTS 6,845,306 B2 *   1/2005  Henry ................... B64D 41/00
                                                         701/29.6
6,925,088 B1     8/2005  Moreaux
(Continued)

FOREIGN PATENT DOCUMENTS

EP      1 860 408        11/2007
GB      2 497 413         6/2013
(Continued)

OTHER PUBLICATIONS

Dohmen, Gert, Processes and Methods for Integrated Modular Avionics, Jul. 7, 2005, Presentation at USA-EU workshop (Year: 2005).*

(Continued)

*Primary Examiner* — Todd Melton
(74) *Attorney, Agent, or Firm* — Nixon & Vanderhye P.C.

(57) ABSTRACT

An aircraft control system including transducers connected by interface units to an avionics network, such as an AFDX network. Each transducer is directly connected to an interface unit local to the transducer. Each interface unit is a configurable unit and has a signal processing module converting data to a format suitable for transmission over the network. Each interface unit may be configurable, via software commands, to operate in an application session mode, a data-loading mode, or a maintenance mode. Each interface unit may be directly associated with one of the software applications of the aircraft control system. The network may include a lower bandwidth part where data communication is conducted over sampling ports only. Interface units may be configured or installed using a plug and play method.

22 Claims, 10 Drawing Sheets

(51) Int. Cl.
  *B64D 45/00* (2006.01)
  *H04L 41/0803* (2022.01)
  *H04L 67/12* (2022.01)

(52) U.S. Cl.
  CPC .......... *H04L 41/0803* (2013.01); *H04L 67/12* (2013.01); *B64D 2045/0085* (2013.01)

(56) References Cited

U.S. PATENT DOCUMENTS

| | | |
|---|---|---|
| 7,242,683 B2 | 7/2007 | Saint Etienne et al. |
| 7,339,901 B2 | 3/2008 | Saint Etienne et al. |
| 7,352,744 B2 | 4/2008 | Saint Etienne et al. |
| 8,503,439 B2 | 8/2013 | Monnier |
| 8,600,584 B2 | 12/2013 | Fervel et al. |
| 2005/0026486 A1* | 2/2005 | Thomas ............... H05K 7/1424 439/188 |
| 2006/0062143 A1 | 3/2006 | Bibby et al. |
| 2011/0103268 A1 | 5/2011 | Mann et al. |
| 2012/0008697 A1* | 1/2012 | Emonide ............. H04L 12/4625 375/259 |
| 2012/0173900 A1* | 7/2012 | Diab ................. H04L 12/40045 713/310 |
| 2013/0024850 A1 | 1/2013 | Nutaro et al. |
| 2013/0156427 A1 | 6/2013 | Lopez et al. |
| 2013/0173828 A1* | 7/2013 | Todd ..................... H04L 67/125 710/5 |
| 2014/0059230 A1 | 2/2014 | Wood |
| 2014/0180504 A1 | 6/2014 | Fervel et al. |
| 2014/0200747 A1* | 7/2014 | Fezzazi .............. G05B 23/0208 701/3 |
| 2014/0245285 A1* | 8/2014 | Krenz ....................... G06F 8/65 717/173 |
| 2015/0254461 A1 | 9/2015 | Leconte et al. |
| 2016/0018793 A1 | 1/2016 | Becker et al. |
| 2016/0236790 A1 | 8/2016 | Knapp et al. |
| 2016/0275982 A1* | 9/2016 | Austerlitz .......... G01D 5/35367 |
| 2018/0092190 A1 | 3/2018 | Range et al. |

FOREIGN PATENT DOCUMENTS

| | | |
|---|---|---|
| WO | 2006007105 | 1/2006 |
| WO | 2014166949 | 10/2014 |

OTHER PUBLICATIONS

Extended Search Report in European Patent Application No. 15275239.0 dated Feb. 3, 2016 (14 pages).

Search Report in Great Britain Patent Application No. 1421107.2 dated Jun. 11, 2015 (3 pages).

Alena, Richard L. et al., "Communications for Integrated Modular Avionics," Aerospace Conference, 2007 IEEE, Piscataway, NJ, Mar. 3, 2007, IEEEAC Paper No. 1230, Version 1.3, Updated Dec. 27, 2006 (18 pages).

IEEE Standard for a Smart Transducer Interface for Sensors and Actuators—Network Capable Application Processor (NCAP) Information Model. IEEE Std. 1451.1-1999, Sponsored by TC-9 Committee on Sensor Technology of IEEE Instrumentation and Measurement Society, Approved Jun. 26, 1999 (349 pages).

Airlines Electronic Engineering Committee (AEEC), "Aircraft Data Network, Part 7, Avionics Full-Duplex Switched Ethernet Network." ARINC Specification 664 P7-1, published by Aeronautical Radio, Inc., Annapolis, MD, Sep. 23, 2009 (150 pages).

European Examination Report cited in Application No. 15 275 239, dated Jan. 19, 2017, eight pages.

* cited by examiner

AVIONICS NETWORKS

RELATED APPLICATIONS

This application is a continuation of U.S. patent application Ser. No. 14/950,745 filed Nov. 24, 2015, (now U.S. Pat. No. 10,331,096) and claims priority to United Kingdom Patent Application GB 1421107.2, filed Nov. 27, 2014, the disclosure of both of these applications is incorporated by reference herein in its entirety.

BACKGROUND OF THE INVENTION

The present invention concerns avionics networks. More particularly, but not exclusively, this invention concerns an aircraft control system for an aircraft comprising an avionics network and related components/parts and associated software. The invention also concerns a method of operating and/or reconfiguring such an aircraft control system, and a method of communicating across an avionics network. The invention also concerns an interface unit configured for use as the interface unit.

With the advent of the "digital aircraft" there has been a drive to improve the integration of modern digital networking concepts with the analogue sensors and actuators that remain as standard in the aircraft industry and to take advantage of the opportunities that arise with the use of data networking in the aircraft.

Airbus has for example developed its own networking standard for handling of data in an aircraft, which is referred to by Airbus as "AFDX". Airbus' AFDX network is a switched full duplex network based on Ethernet network technology (based on the IEEE 802.3 standard). AFDX networks are typically fully compliant with Part 7 of ARINC 664 (one of the standards provided by Aeronautical Radio, Incorporated or "ARINC"). The term AFDX is used by Airbus as a trade mark but the technical characteristics of an AFDX network are well-defined and understood by those skilled in the art. The term "AFDX" alludes to the main characteristics of the network—i.e. one that is specifically designed for Avionics and is a Full DupleX network.

The present application is concerned primarily with the use of, and improvements to, such avionics networks, particularly networks compliant with Part 7 of ARINC 664, and parts thereof, in the context of commercial airliners, although there may be applications in other fields of avionics such as transport/freight aircraft, military aircraft and the like.

U.S. Pat. No. 6,925,088 has been cited as an Airbus patent that concerns Airbus' AFDX network technology, but there are various patents that relate to AFDX networks and related concepts. U.S. Pat. No. 6,925,088 itself concerns an avionics network including subnets of peripheral units (such as computers, closed loop controllers, and the like) each subnet being connected by a star distributor implemented in the link layer (of the OSI model). The star distributor facilitates direct communication between the peripheral units on the subnet using MAC addresses on the link layer. Periodic and aperiodic data communication is also discussed, as is the use of an Ethernet-type network in such a way that negates the need for collision detection. The invention of U.S. Pat. No. 6,925,088 assists in the use of commercially available data busses (outside the avionics field) with avionics data busses specifically developed for aircraft applications.

U.S. Pat. No. 7,242,683 (related to U.S. Pat. Nos. 7,339,901 and 7,352,744) mentions the use, in the civil aeronautics field, of ARINC 429-based avionics networks and the desire to integrate with Ethernet-type networks. U.S. Pat. No. 7,242,683 recognises the need in avionics networks for segregation of data flows and for providing reliable (guaranteed) data transfer performance (in terms of network access, latency, etc.) for certain avionics applications. U.S. Pat. No. 7,242,683 discloses an AFDX network in the form of an avionics-compatible deterministic switched full-duplex Ethernet-type network utilising Ethernet-type data frames. (U.S. Pat. No. 7,242,683 defines the term "full-duplex" as meaning that the subscriber can send and receive packets at the same time on the same link and the term "switched" as meaning that the packets are switched in switches on appropriate outputs. "Deterministic" as used here means that the network guarantees certain things such as network access, latency, bandwidth and logical segregation of certain data flows). In particular, U.S. Pat. No. 7,242,683 discloses the concept of virtual links within the AFDX network. Thus, there is disclosed an AFDX network having source subscriber equipment and destination subscriber equipment connected to each other via a physical link incorporating a network switch and connected via a virtual link. The virtual link is defined as the conceptual representation of a link (over the data link layer—layer 2 of the OSI model) from the source equipment to the destination equipment, in which the Ethernet-type frames transmitted provide for segregation between virtual links and allocation of a fixed passband for each virtual link. Virtual links are multiplexed, by means of the data frames (there typically being a sequence of Ethernet frames, each frame being associated with a single virtual link) over the physical link layer. It will be understood of course that "subscriber equipment" will typically comprise one or more sensors/actuators that are connected to the AFDX network by means of a network terminal that forms part of the subscriber equipment, the equipment thus including an appropriate interface (encoding/decoding equipment) which converts between analogue signals native to the sensor(s)/actuator(s) and the data frames used on the network. Each such item of subscriber equipment will be designed for the specific application to which the actuators/sensors are to be put on the aircraft. Some items will require more data processing than others, and some items may require analogue-to-digital converters (ADCs) and no digital-to-analogue converters (DACs), whereas others may require DACs and no ADCs. The processing and memory requirements vary from one type of equipment to another.

U.S. Pat. No. 8,503,439 proposes connecting a subscriber (comprising sensors/actuators) to an AFDX network by means of a frame switching device being located locally to the sensor/actuator equipment to which it is connected. Having a network in which there are several local switches, as opposed to connecting each item of sensor/actuator equipment to a respective frame switch in a centrally located avionics IT rack, has the potential benefit of reducing the amount of wiring needed to connect the sensors/actuators. Each item of sensor/actuator equipment is configured for digital data communication with its local switch device and is arranged to receive/transmit data frames. The local switch device thus has a first port connected to the AFDX network (to a switch of the network or to a terminal) and one or more second ports connected to the items of on-board sensor/actuator equipment. U.S. Pat. No. 8,503,439 proposes polling (sampling) data frames on ports of the local switch, periodically and in turn, and replicating such frames onto other ports of the local switch. The local switches proposed in U.S. Pat. No. 8,503,439 have been developed further and are now generally referred to as AFDX micro-switches. The polling and copying functions mentioned above provide that the AFDX micro-switches have a hub function over the downlink and a switching function over the uplink. The term μAFDX-network (micro AFDX network) has been used to refer to the network (or subnet) that comprises an AFDX micro-switch and the items of sensor/actuator equipment connected via that AFDX micro-switch to the rest of the avionics network.

U.S. Pat. No. 8,600,584 concerns an aircraft control system in which different avionics software applications associated with different aircraft functions can share one or more sensors via an AFDX network. U.S. Pat. No. 8,600,584 also discloses the use of data concentrator devices for connecting multiple subscribers to an AFDX network. Specifically, U.S. Pat. No. 8,600,584 describes a network configuration in which measurements provided by sensors are acquired, multiplexed, and converted into AFDX messages by remote data concentrators before being passed onto the AFDX network for receipt by a central computer which runs the avionics software applications. Control messages are received by local control units which are each configured to convert AFDX messages into control signals for receipt by the actuators connected to the local control unit. The sensors connected to such remote data concentrators are available for use by different avionics applications. As such the remote data concentrators are a shared resource on the AFDX network.

US 2013/156427 concerns the extension of an AFDX network (in which, as described above, subscribers to the AFDX network are each directly connected to a switch of the network, and in which data is transmitted as IP packets encapsulated in Ethernet-type frames having virtual link identifiers). It is recognised in US 2013/156427 that AFDX micro-switches enable the AFDX network to be extended so that additional/remote items of equipment can access it (i.e. by means of the AFDX micro-switch being connected directly between a frame-switch of the AFDX network and the items of equipment and functioning as described above, so that frames received on the downlink are replicated to all the items of equipment and any frame received over the uplink from any item of equipment is forwarded to the AFDX frame-switch to which AFDX micro-switch is connected). US 2013/156427 proposes the extension of the AFDX network by means of a passive optical network ("PON") that sits between the AFDX network backbone and at least some of the items of on-board sensor/actuator equipment. US 2013/156427 also proposes μAFDX (micro AFDX).

US 2014/180504 concerns an aircraft control system utilising an AFDX network. There is provided a central computer which has MONitoring ("MON") and COMmanding ("COM") modules which communicate with items of remote equipment (such equipment including actuators/sensors) subscribed to the AFDX network over virtual links, some of which sharing a common path, over an AFDX network, but which are nevertheless segregated at the application layer. US 2014/180504 also acknowledges the move towards Integrated Modular Architecture (IMA) in avionics networks such that general purpose computers, in the form of electronic cards mounted in an IT rack in the avionics bay, perform various avionics functions over an AFDX network but differ from each other essentially by the software that is executed therein.

Improvements to avionics networks, such as networks compliant with Part 7 of ARINC 664 for example, need to be made bearing in mind the avionics context. Network protocols and standards for non-avionic, or general, application are typically poorly suited to use in avionics. The use of networks, which are compliant with Part 7 of ARINC 664, in aircraft control systems has advantages over other standard protocols, for example.

It will be seen that reduction in the mass attributable to wiring of sensors and actuators (hereinafter collectively referred to as transducers) is desirable. There is a desire to further develop the Integrated Modular Avionics ("IMA") approach and to further decentralize avionics with the use of remote electronics. The use of many different types of hardware, particularly new hardware, in avionics is undesirable however owing to certification requirements, maintenance requirements and the like. If there is a desire to use a new, perhaps improved, type of transducer in an avionics system, those parts of the system that change as a result of the integration of such a new component will need to be certified (re-certified). If there are many intervening pieces of hardware/software that need to be reconfigure/reprogrammed in order to accommodate such a new component, all such pieces of hardware/software may need to be recertified before the new components can be used in service.

Avionics systems also need to be suitable for routine testing on-the-ground during maintenance. Distributing yet more electronic devices remotely from the central avionics bay needs to be balanced with the ability to perform such maintenance and testing. Maintenance may include installation and/or reconfiguring an item of electronic equipment at a location remove from the avionics bay. It may be desirable for dataloading operations to be conducted in performing such tasks. Dataloading operations may also be required to download data retrieved by sensor systems on the aircraft for subsequent (off-line) analysis. Dataloading can be slow and can cause undesirable delays, particularly if dataloading operations need to be performed on an item of equipment, or removable part thereof, off the aircraft, for example in a workshop environment. Dataloading on ground when an item of equipment needs to be configured/reconfigured/programmed or the like typically has to be fully completed before the avionics system can be powered up, potentially causing knock-on delays.

It has been proposed that dataloading controllers, on an aircraft, use a dedicated virtual link and port to multicast what dataloads are available. Subscriber equipment/modules can then respond to this multicast and request a dataloading transaction. Such a proposal utilises two-way communication using both receive and transmit ports and requires all equipment/modules to know the multicast message to subscribe to and which dataloads are needed for the particular equipment/module.

When seeking to make improvements to the avionics network of an aircraft other factors need to be borne in mind. Consideration may need to be given to the overall mass difference introduced by any such improvements. Consideration may need to be given to the increase or reduction in certification requirements introduced by any such improvements. Consideration may need to be given to the overall cost of any such improvements. Consideration may need to be given to the time taken for configuration and ongoing maintenance introduced by any such improvements.

The present invention seeks to mitigate one or more of the above-mentioned problems. Alternatively or additionally, the present invention seeks to provide an improved avionics network and/or an improved aircraft control system. Alternatively or additionally, the present invention seeks to provide an improved means of integrating transducers in a "digital aircraft". Alternatively or additionally, the present invention seeks to provide an improved means of configuring the network, parts thereof, and/or components/parts attached thereto, of a "digital aircraft" whilst easing certification requirements. Alternatively or additionally, the present invention seeks to provide an improved method of operating and/or reconfiguring an aircraft control system, and/or an improved method of communicating across an avionics network.

SUMMARY OF THE INVENTION

The present invention provides, according to a first aspect, an aircraft control system for an aircraft, wherein the aircraft control system comprises a plurality of transducers, a plurality of interface units, and an avionics network; each transducer is directly connected to one of the interface units, such that each interface unit is directly connected to one or more of the transducers; each interface unit is in the form of a configurable unit, so that all interface units are substantially identical; each interface unit is located locally to the one or more transducers directly connected to the unit; each interface unit is provided with a local signal processing module which receives signals from, and/or transmits signals to, the one or more transducers directly connected to the unit, processes those signals, and converts between such signals to/from the transducer and digital signals in a form suitable for transmission over the avionics network, thus providing a communications link between the one or more transducers directly connected to the unit and the avionics network.

According to a second aspect of the invention there is also provided an aircraft control system for an aircraft, wherein the aircraft control system comprises a plurality of transducers, a plurality of interface units, and an avionics network; each transducer is directly connected to one of the interface units, such that each interface unit is directly connected to one or more of the transducer; each interface unit is in the form of a configurable unit; each interface unit is provided with a local signal processing module which receives signals from, and/or transmits signals to, the one or more transducers directly connected to the unit, processes those signals, and converts between such signals to/from the transducer and digital signals in a form suitable for transmission over the avionics network, thus providing a communications link between the one or more transducers directly connected to the unit and the avionics network; and each interface unit is configurable, via software commands, to operate in any one of a set of operating modes, the set of operating modes comprising an application session mode, a data-loading mode, and a maintenance mode.

According to a third aspect of the invention there is also provided an aircraft control system for an aircraft, wherein the aircraft control system comprises a plurality of transducers connected via an avionics network to a central computer, there being a plurality of different physical systems within the aircraft utilising one or more of the plurality of transducers; the aircraft control system provides a plurality of different applications for monitoring or controlling different aspects of the aircraft's operations; each transducer of the plurality of transducers is directly connected to an interface unit that is connected to the avionics network; each interface unit is directly associated with only one of the different physical systems within the aircraft; and each interface unit is directly associated with one only of the applications of the aircraft control system.

According to a fourth aspect of the invention there is also provided a method of operating an aircraft control system for an aircraft during operation of, or maintenance of, the aircraft, wherein the aircraft control system is in accordance with any aspect of the present invention as claimed or described herein, including any optional features relating thereto.

According to a fifth aspect of the invention there is also provided a method of communicating across an avionics network of an aircraft control system installed on an aircraft, wherein the aircraft control system comprises a plurality of transducers connected via an avionics network to a central computer, the avionics network operating over a higher bandwidth; each of the plurality of transducers is directly connected to a respective one of a plurality of interface units such that each transducer is directly connected to only one interface unit and each interface unit is directly connected to one or more transducer; each interface unit has a local signal processing module which receives signals from, and/or transmits signals to, one or more of the transducers, processes those signals, and converts between such signals to/from the transducer(s) and digital signals in a form suitable for transmission over the avionics network, thus providing a communications link between the one or more transducers and the avionics network; and there is at least one sub-network operating over a modified avionics network, separating at least some of the interface units from other parts of the avionics network; the modified avionics network operating over a lower bandwidth; parts of the higher bandwidth avionics network facilitating communication via both queuing ports and sampling ports, whereas the modified avionics network is prevented by means of an associated protocol from communication via queuing ports and is thus limited to using sampling ports; and wherein the method comprises the following steps: a first step in which an application running on the central computer transmits a request for action by one only of the interface units which is connected to the avionics network via a sub-network; a second step in which at least said one only of the interface units receives the request; a third step in which said one only of the interface units transmits a confirmation message indicating receipt of the request; and a fourth step in which the application running on the central computer receives said confirmation message; both of the second and third steps utilising a communication protocol that facilitates communication over a sampling port by means of use of a network layer higher than the transport layer.

According to a sixth aspect of the invention there is also provided a method of reconfiguring the function of an existing aircraft control system installed on an aircraft, wherein the aircraft control system comprises a plurality of transducers connected via an avionics network to a central computer, there being at least one interface unit having a local signal processing module which receives signals from, and/or transmits signals to, one or more of the transducers, processes those signals, and converts between such signals to/from the transducer(s) and digital signals in a form suitable for transmission over the avionics network, thus providing a communications link between the one or more transducers and the avionics network, and wherein the method comprises the following steps: an interface unit sending, over the avionics network, communication session data from the local signal processing module which is then received by an interface unit agent module on the avionics network; the interface unit agent module in response to the communication session data so received, sending data to the interface unit which configures the interface unit to operate in a specified way; and the interface unit then continuing to operate in the specified way.

According to a seventh aspect of the invention there is also provided an aircraft comprising an aircraft control system in accordance with any aspect of the present invention as claimed or described herein, including any optional features relating thereto.

According to an eighth aspect of the invention there is also provided an interface unit configured for use as the interface unit that is used in a method according to, or forms part of an apparatus according to, any aspect of the present invention as claimed or described herein, including any optional features relating thereto.

According to a ninth aspect of the invention there is also provided a computer configured for use as the central computer that is used in a method according to, or forms part of an apparatus according to, any aspect of the present invention as claimed or described herein, including any optional features relating thereto.

According to a tenth aspect of the invention there is also provided a computer program product configured to cause, when the computer program is executed, a local signal processing module of an interface unit to perform the steps performed by the interface unit in a method according to any aspect of the present invention as claimed or described herein, including any optional features relating thereto.

According to an eleventh aspect of the invention there is also provided a computer program product configured to cause, when the computer program is executed, a central computer to perform the steps performed by the central computer in a method according to any aspect of the present invention as claimed or described herein, including any optional features relating thereto.

According to a further aspect of the invention there is also provided an aircraft control system in an aircraft, wherein the aircraft control system comprises:

transducers, an avionics network, and interface units each configured as a communication link between the avionics network and one or more of the transducers, the one or more of the transducers associated with each interface unit being directly connected to the interface unit and being positioned at, or near to, the same location on the aircraft as the interface unit, and each interface unit including a local signal processing module configured to receive signals from the one or more transducers directly connected to the interface unit and to convert the received signals into a format suitable for transmission over the avionics network, and wherein each interface unit is configurable to operate in any of at least two operating modes, the selectable operating modes including at least two of an application session mode, a data-loading mode and a maintenance mode.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
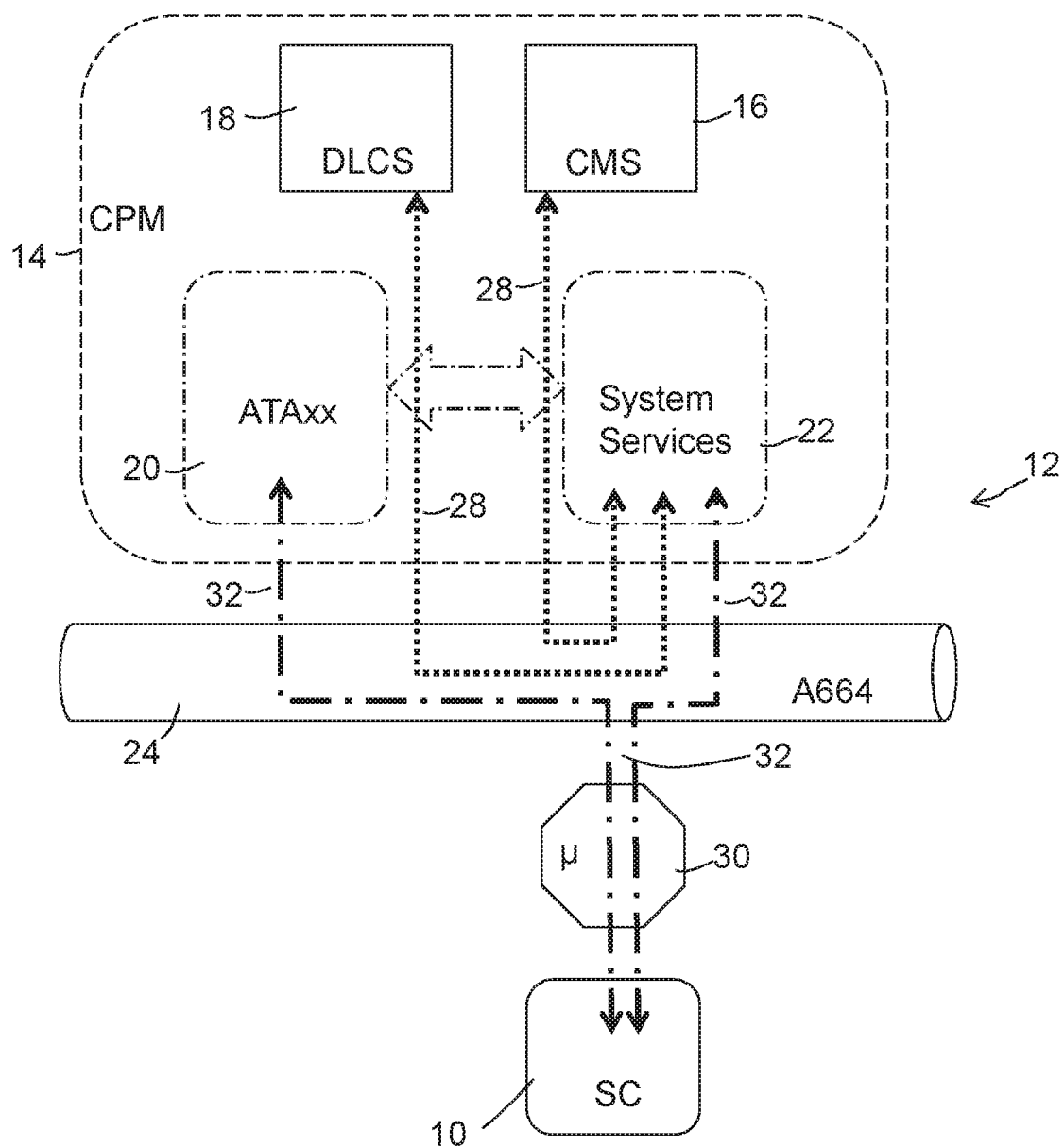
FIG. 1 shows an avionics network according to a first embodiment of the invention.

Embodiments of the present invention relate to an aircraft control system for an aircraft (which may be referred to as a "digital aircraft") in which a plurality of transducers are connected to an avionics network, for example a network compliant with Part 7 of ARINC 664, via at least one interface unit. A network compliant with Part 7 of ARINC 664 will be referred to hereafter as an A664 network, and the associated protocols will be referred to as A664 protocols and so on. The A664 network may be in the form of an AFDX network of the type employed by Airbus.

There now follows a general description outlining the general concepts embodied by such embodiments. The aircraft control system will typically be in the form of one or more avionics systems comprising transducers and an avionics network, for example an A664 network. The transducers may comprise one or more sensors. The transducers may comprise one or more actuators. The transducers may comprise one or more essentially analogue components, such that the transducer is configured for sending analogue electrical signals and/or for receiving analogue electrical signals. The avionics network is configured to provide a means of communication between digital devices (devices configured for sending/receiving data in digital form) on the network. For example, the aircraft will typically include at least one computer, for example a core processing module (or "CPM"), which interacts with various devices on the network and is able, via the network, to read measurements from sensors on the aircraft and to send control instructions to actuators on the aircraft. There may be various avionics systems associated with various avionics applications executed on a computer (or other equivalent hardware) which perform various functions during operation of the aircraft. For example, there may be electrically activated actuators for moving a part of a nose landing gear ("NLG") and associated sensors for detecting the position of the part, both communicating with an NLG control application in a partition of the CPM, where communication is facilitated across the avionics network.

The present embodiments have particular application in relation to the case where the avionics network is an A664 network (for example an AFDX network, according to the standards and protocols developed by Airbus). An AFDX network is referred to as such by Airbus because it is a switched Avionics Full DupleX Ethernet-based network (one based on the IEEE 802.3 standard). Part 7 of ARINC 664 (one of the standards provided by Aeronautical Radio, Incorporated or "ARINC") provides further details of such an A664 network. An A664 network is full-duplex, in that a subscriber can send and receive packets at the same time on the same link. An A664 network is deterministic, in that the network guarantees network access, latency, bandwidth and logical segregation of dataflows. A664 networks typically provide redundancy by means of duplication of certain parts. End Systems ("E/S") exchange data frames through virtual links (VL) across the network, each virtual link representing a unidirectional connection from a source End System to one or more destination End Systems. An E/S will typically perform traffic policing, data integrity checking and redundancy management on a per link basis, and for example may control the flow of traffic for each link in accordance with a predetermined Bandwidth Allocation Gap (BAG) value. Subscriber equipment on or connected to the network will typically be in the form or, or comprise, an End System. Each interface unit may define, or include, such an end system which enables it to connect to the network. The network will typically comprise at least one source subscriber equipment and at least one destination subscriber equipment connected to each other through at least one physical link through at least one switch and through at least one virtual link. Each interface unit may be considered as an example of such subscriber equipment. As mentioned above, the virtual link links between at least one source subscriber equipment and at least one destination subscriber equipment. A single virtual link will typically link between a single item of source subscriber equipment and one or more items of destination subscriber equipment (one-to-one or one-to-many). A virtual link may have a defined direction of communication. The virtual link may be mono-directional. The virtual link may have a fixed passband. The virtual link may have a guaranteed maximum time for the transfer of packets from the source equipment to the destination equipment. The virtual link may have a fixed (physical) path on the network. Each virtual link may have a single unique identifier. Such an identifier will thus feature in the data frames sent over the network. The network is preferably arranged such that there is segregation between virtual links. A single data frame will typically relate to a single virtual link.

In accordance with various embodiments of the invention, one or more interface units provide the means for interfacing between the transducers and A664 network. The interface unit provides a communications link between the one or more transducers connected to the unit and the A664 network. The interface unit may be configured to subscribe to at least one virtual link in the A664 network. It may be that each transducer is connected to one, and possibly only one, of the interface units. Each interface unit may however be connected to one or more of the transducers. It may be that each transducer is directly connected to an interface unit. There may be many interface units, for example two or more, possibly at least five such interface units in the aircraft control system. Optionally, each interface unit is in the form of a configurable unit. In such a case it may be that all interface units are substantially identical, in hardware terms at least. It may be that each such interface unit is in the form of a general purpose interface unit, being configurable for specific applications. It may be that the interface unit can be considered as being a generic interface unit. It will be appreciated that each interface unit may be configured differently, so as to perform a specific function and/or interact with particular transducers in a particular way, despite being based on a generic design template. Each interface unit may be located locally to the one or more transducers directly connected to the unit. It will therefore be understood that, in such a case, the one or more transducers connected to the interface unit may all be located locally to the interface unit. In such a case, the interface unit and its associated transducers will be located in a small region around a given location on the aircraft. Connecting transducers which are at, or near to, a given location on the aircraft to a local transducer unit, may reduce the mass and/or length of wiring on the aircraft. All of the transducers connected to the interface unit may be located locally. Each interface unit may be provided with a local signal processing module, which receives signals from, and/or transmits signals to, the one or more transducers directly connected to the unit. The processing module is configured to processes such signals. The processing module may be arranged to convert between analogue signals and digital signals. The processing module may thus comprise at least one analogue-to-digital converter. The processing module may thus comprise at least one digital-to-analogue converter. Such a converter (or such converters) may be considered as forming a part of the processing module of the interface unit. It will be appreciated however the processing module may comprise a processor that is provided on separate hardware from the hardware that provides the analogue ⇔ digital signal conversion. It is however beneficial for the interface unit to include a signal converter, preferably as an integral part. The various functions of the interface unit may all be provided as integral parts of the same unit of hardware. It may be that the processing module is configured to convert to/from data packets (which may define or form part of data frames), for example in the form of A664 messages (for example, AFDX messages). It may be that the interface unit is configured, typically by means of an appropriately configured processing module, to convert to/from digital signals in a form suitable for transmission over the A664 network.

It may be that the interface unit is able to be configured to operate as part of any one of a multiplicity of different aircraft systems. The multiplicity of different aircraft systems may comprise three or more (preferably five or more) of the aircraft control systems associated with the following on the aircraft:

Air Conditioning
    Communications
    Fire Protection
    Flight Control
    Fuel
    Ice & Rain Protection
    Landing Gears
    Navigation
    Oxygen
    Pneumatic
    Water Waste
    Inert Gas Generation System
    Auxiliary Power
    Cargo Compartment
    Doors Providing a configurable, interface unit with its own processing capabilities that connects transducers to an A664 network can be considered as providing a means which converts one or more "dumb" transducers into "smart transducers". The interface unit and its associated directly connected transducers may be viewed therefore as a "smart component". The use of such an interface unit having a generic design which may be used to connect any combination of various different transducers to an avionics network for use by any one of a selection of different avionics applications, may have significant benefit in modular avionics systems.

The interface unit may be in the form of a device configured to receive command messages, for example from an application running on a central computer for commanding an actuator connected to the interface unit. The interface unit may be in the form of a device configured to send monitoring messages, for example to an application running on a central computer concerning measurements made by a sensor connected to the interface unit. The interface unit may able to be configured and used as a device that deals with command messages but not monitoring messages. The interface unit may be configured and used as a device that deals with monitoring messages but not command messages. The interface unit may able to be configured and used as a device that deals with both command messages and monitoring messages.

In one such embodiment, at least some of the interface units are configured to operate in a command mode, such that in use for each such unit, the unit forwards and translates commands from a central computer to one or more transducers directly connected to the unit, each interface unit is provided with a local signal processing module which receives signals from, and/or transmits signals to, the one or more transducers directly connected to the unit, processes those signals, and converts between such signals to/from the transducer (for example, signals in the form suitable for the transducer, or "native" signals) and digital signals in a form suitable for transmission over the A664 network, thus providing a communications link between the one or more transducers directly connected to the unit and the A664 network. It may also, additionally or alternatively, be that at least some of the interface units are configured to operate in a monitoring mode, so that in use for each such unit, the unit forwards and translates signals from one or more transducers directly connected to the unit to a central computer, each interface unit is provided with a local signal processing module which receives signals from, and/or transmits signals to, the one or more transducers directly connected to the unit, processes those signals, and converts between such signals to/from the transducer (for example, signals in the form suitable for the transducer, or "native" signals) and digital signals in a form suitable for transmission over the A664 network, thus providing a communications link between the one or more transducers directly connected to the unit and the A664 network.

Each interface unit may be configurable, for example via software commands, to operate in any one of a set of different operating modes. Such software commands may be transmitted via the A664 network. Such software commands may be transmitted to an interface unit from a remote source, such as an application running on a computer. One such operating mode may be a data-loading mode (for example only being available when the aircraft is not operational). One such operating mode may be a maintenance mode (for example only being available when the aircraft is not operational). One such operating mode may be an application session mode (for example during operation of the aircraft). The interface unit may be configurable to operate in any one of multiple different types of application session mode each corresponding to a particular application concerning a particular aircraft system. The interface unit may have a mode, which may be the data-loading mode or may be a different mode, for configuring which of a variety of different applications it will operate under. There may be many different applications (for example requiring the interface unit to interface with different types of transducers and/or concerning different aircraft systems) for which the configuration of the interface unit needs to be varied and/or set-up. Having a generic interface unit that is readily configurable to operate in relation to any one of a plurality of different applications enables fewer spare parts to be carried by an operator/maintenance workshop. In certain embodiments the aircraft control system may be so arranged that when installing an interface unit on an aircraft it is, at least partly, automatically configured according to its location of installation and/or the transducers attached to it and/or its stated desired function. It is preferred that the interface unit is configurable, via software commands, to operate in any one mode selected from a set of operating modes comprising an application session mode, and one or both of a data-loading mode and a maintenance mode. User defined services may also be available, for example as a separately defined mode of operation of the interface unit, which may for example be provided by means of a particular configuration of the interface unit (for example, my means of software data-loaded onto the interface unit).

The local signal processing module may be in the form of one or more processing units. The local processing power may be used to decentralize at least some of the signal processing that would previously have been conducted remotely from the transducer. There may as a consequence be less electric cabling carrying such signals within the aircraft.

It may be that one or more interface units are connected to the A664 network via a suitable network switch. It may be that one or more interface units are connected to the A664 network by other means, for example not requiring such a network switch. Each interface unit will typically be connected to the avionics network via a network switch unit, for example a switch which has a hub function over the downlink and a switching function over the uplink. Such a switch may be referred to as a micro-switch (and for example be in the form of an AFDX micro-switch). One or more parts connected to the A664 network via a micro-switch (for example a single micro-switch) may be considered as being on a micro-A664 network. The micro-A664 network may be a shared resource on the A664 network, such that multiple applications may access different parts of the same micro-A664 network. At least parts of the A664 network will typically provide for communication over both sampling ports and queuing ports, whereas such a micro-A664 network may be limited, by hardware or by software-implemented protocol, that communication within, to or from the micro-A664 network using one or more sampling ports, and no queuing ports. For example, the interface unit may define an end system ("E/S") that communicates over the network using one or more sampling ports but no queuing ports. A special protocol may be adhered to which allows communication to be conducted over sampling ports but no queuing ports. Such a protocol may be in the form of the Smart Component Communication Protocol (SCCP) described in further detail below. The special protocol may operate across a single channel. The special protocol may be based on, and comply with, A664 message/frame formats (for example AFDX message formats). The A664 message payload (e.g. the payload of an A664 data frame) may be used to encapsulate a further packet, complying with the special protocol. The further packet may be considered as operating within one or more layers of the OSI model being above the transport layer, for example in the application layer. The further packet may comprise a transaction number (or "ID") that allows differentiation between consecutive instructions. The special protocol may be implemented in the interface unit. The special protocol may be implemented in each avionics computing resource. The operation of the special protocol across the network may at least in part be controlled by a proxy server, for example implemented in the same computing resource as the avionics computing resource. Such a proxy server may be configured to control at least part of the configuration and/or operation of the interface unit, by means of A664 messages transmitted across the A664 network. The proxy server may for example function as the Smart Component Agent mentioned in further detail below.

As mentioned above, the aircraft control system may comprise at least one computer, in the form for example of a central computing resource (or avionics computing resource), such as a Core Processing Module ("CPM") on which there are provided one or more avionics applications that, in use, communicate across the A664 network with the transducers connected to the interface units. The central computing resource may be partitioned to provide a plurality of different avionics applications, one application being provided by each partition. A first interface unit may be associated with a first avionics application. A second interface unit may be associated with a second (different) avionics application. It may be that the transducers connected to the first interface unit include at least one transducer that is different from each one of the transducers connected to the second interface unit. Whilst the first and second interface units may both be in the form of the same generic configurable unit, and thus substantially identical in hardware terms, the first and second interface units are configured differently in software. It may be that there are a plurality of different physical systems, on the aircraft, utilising one or more of the plurality of transducers. Each physical system may be controlled/associated with one or more avionics applications. It may be that each interface unit is directly associated with only one of the different physical systems within the aircraft. It may be that each interface unit is directly associated with only one of the avionics applications. The aircraft control system may thus be so arranged that each of the interface units on the A664 network is a non-shared resource. It may be that no gateway is then required for routing traffic between the avionics application and the associated transducers. The transducers may, by means of the interface unit, effectively connect directly (in networking terms) to the A664 network. Thus there may be a method of operating the aircraft control system in which a message is sent between an avionics application on a computer and an interface unit connected to the transducers managed/controlled by the avionics application whereby the message does not pass via any gateway device.

The interface unit will typically comprise a local memory store for data. For example, the interface may comprise volatile (for example in the form of RAM) and preferably also some non-volatile memory ("NVM"). The NVM may be configured to store configuration data, which configures the interface unit for example. The NVM may for example be configured to store data recorded during operation of the aircraft. Data stored in the NVM may include BITE (Built-In Test Equipment) data. BITE data may be normal BITE data and/or interactive BITE data. BITE data may relate to the interface unit and/or the transducers connected to it. Data stored in the NVM may include health monitoring data. Data stored in the NVM may include data logbooks. Data may be uploaded and/or downloaded by means of a data loading operation. The dataloading operation may be operated at least in part over the A664 network. Data stored in the NVM may include configuration data. For example, firmware may be dataloaded onto the interface unit. It may be that configuration files (such as network configuration files, calibration data, and the like) are dataloaded onto the interface unit.

As mentioned above, the files that are data-loaded may include various data. Such data typically includes data on the aircraft type, position specific network information, configuration tables, and up-to-date software for operations. Data may be encoded and/or compressed before being transmitted across the network. Such data encoding/compression may include defining of patterns, dedicated ranges, or constants in the network configuration. For example, the MAC address of the Smart Component may be deemed to be equal to a base MAC address plus an offset based on the position ID (identification number/code) of the Smart Component. A global ID (identification number/code) for a given file may be deemed to be equal to the position ID multiplied by a factor plus an offset based on the local file ID. The factor is chosen to be sufficiently high (say at least 50) to ensure no duplication of file IDs (a variable which can be set with the knowledge of the maximum feasible number of local files).

The present invention also facilitates the provision of embodiments relating to methods of operating an aircraft control system for an aircraft and/or installing, maintaining and/or configuring the aircraft control system. Some such methods will now be described.

In the case where each interface unit is configurable, via software commands, to operate in different operating modes, there may be provided an interface unit agent module that operates as a proxy server for controlling/facilitating the flow of data. The interface unit agent may for example function in the same manner as the Smart Component Agent mentioned in further detail below. The interface unit agent may be provided on the A664 network, possibly in the same computing resource as the avionics applications, for example on a central computer. Various steps may be performed. The interface unit may send, over the A664 network, communication session data from the local signal processing module of the interface unit which is then received by the interface unit agent module. The interface unit agent module may, for example as a response to communication session data received, send data to the interface unit which configures the interface unit to operate in a specified way, for example in any of the modes of operation mentioned above. The interface unit, once so configured, may then operate in the specified way, for example performing the function of the specific mode of operation chosen. It may be that the interface unit requires transducer configuration data that configures the interface unit to operate with specific transducers connected to the interface unit For example, the interface unit may receive transducer configuration data that configures the interface unit for operation with specific transducers connected to the interface unit.

In the case where there is communication across an A664 network in which at least part of the network is prevented, for example by means of an associated protocol, from communication via queuing ports and is thus limited to using sampling ports, there may be a step of communicating over the sampling port by means of use of a network layer higher than the transport layer, for example in the application layer. (Reference here to the layers of the network can be understood with reference to the standard OSI model, in which there are multiple logical layers, such that a lower layer serves its adjacent higher layer, with lower layers being closer to the physical layer of the network system and higher layers being closer to the application layer of the network system.) Other parts of the A664 network may facilitate communication via both queuing ports and sampling ports, of course. The part of the avionics network (e.g. A664 network) in which communication is via one or more sampling ports only may be referred to as a modified avionics network (e.g. a modified A664 network). The modified A664 network may be in the form of a micro-A664 network (for example a micro-AFDX or "μAFDX network"). The modified A664 network may define or form part of a sub-network ("subnet"). The modified A664 network may act to separate at least some of the interface units from other parts of the A664 network. The modified A664 network may be configured to operate over a lower bandwidth than such other parts of the A664 network. There may be performance of a step in which an application running on a central computer transmits a request for action by one only of the interface units which is connected to the A664 network via a sub-network, for example a micro-A664 network (e.g. a micro-AFDX network). There may be performance of steps in which at least said one only of the interface units receives such a request, and transmits a confirmation message indicating receipt of the request, those steps preferably utilising a communication protocol that facilitates communication over a sampling port by means of use of a network layer higher than the transport layer (for example the application layer). The request message so transmitted and so received may be in the form of an Ethernet-type packet (for example comprising an AFDX message) including a payload which provides a transaction identity code. Such a transaction identity (which may be for example be in the form of, or comprise, a sequence number), effectively provided in the application layer, may assist in facilitating communication over sampling ports without observing an A664 protocol. There may be performance of a step in which the application running on the central computer receives such a confirmation message. All such steps as just mentioned preferably utilise a communication protocol that facilitates communication over a sampling port by means of use of a network layer higher than the transport layer (for example the application layer). Such a communication protocol may comply with, or be in the form of, the Smart Component Communication Protocol (SCCP) described in further detail below.

Embodiments of the invention are envisaged in which data files are dataloaded to or from a local memory unit of the interface unit. There may be methods of embodiments of the invention in which a file transfer request is issued to an interface unit, for example from an application running on a central computer. The application running on the central computer could be in the form of an avionics application. The application running on the central computer could be one running under the control of a proxy. The application running on the central computer could be one that performs a maintenance function that is separate from any avionics applications running or stored on the central computer. The application running on the central computer could be one that performs a controlling function that is separate from any avionics applications running or stored on the central computer. There may then be a step of transferring a file from or to the local memory unit of the interface unit. Such steps may be conducted using sampling ports only (i.e. not using queuing ports). Such steps may be conducted across the A664 network. There may be a step of storing data collated during operation of the aircraft in the local memory unit of an interface unit. The step of transferring a file from the local memory unit of the interface unit may in such a case be conducted by downloading data via the interface unit to an external memory device.

There is provided a method in which there is performed a step of installing an interface unit within an existing aircraft control system installed on an aircraft. For example an old interface unit connected to existing transducers needs to be replaced by a new interface unit, which is connected to the same transducers. Alternatively, it may be that both a new interface unit and new transducers are newly installed on the aircraft. There is provided a method in which there is performed a step of connecting one or more transducers to an interface unit of an existing aircraft control system installed on an aircraft. Such methods may require a step in which there is configuration of the interface unit (including newly configuring the interface unit or reconfiguring the interface unit). For example, it may be that the interface unit requires transducer configuration data that configures the interface unit to operate with specific transducers connected to the interface unit. The configuration of the interface unit network may include configuration data that facilitates communication across the avionics network (e.g. an A664 network, or an AFDX network) by the interface unit (including improving, enhancing and/or updating associated communication protocols). There may be a configuration step in which the interface unit agent module sends network configuration data to the interface unit to configure the interface unit in relation to communication across the A664 network by the interface unit, for example, implementing one or more communication protocols. Such configuration is preferably fully or partly automated. As such the installation and configuration of such an interface unit may be considered as providing "plug and play" functionality.

Such a "plug and play" method may include a step of the interface unit initially being configured for communication, over an A664 network, using a basic network communication protocol. Such a basic network communication protocol may be preinstalled on the interface unit, for example in software, for example by means of configuration data stored in memory in the interface unit. Such a basic network communication protocol may be considered as a default network configuration. There may be several such possible basic network configurations available for use by the interface unit. It may be that a single one of several such possible basic network configurations is able to be selected, for example by means of settings in software or in pin programming. There may be a step of the interface unit sending, over the A664 network, communication session data in accordance with such a basic network communication protocol. There may then be a step of the interface unit agent module sending network configuration data to the interface unit so as to configure the interface unit for communication using a different network communication protocol, for example one that is more up-to-date than the basic network communication protocol, one that offers more features than the basic network communication protocol, and/or one that is tailored to the specific role that the interface unit is intended to perform. The network configuration data sent to the interface unit may be such that the interface unit then has a complete network configuration, as compared to its former default network configuration.

There may be an embodiment in which there is provided a method of reconfiguring the function of an existing aircraft control system installed on an aircraft. In the context of such embodiments, the aircraft control system will typically comprise a plurality of transducers connected via an A664 network to a central computer, there being at least one interface unit of the type described and claimed herein providing a communications link between the one or more transducers and the A664 network. The (re-)configuring method may comprise a step in which an interface unit sends, over the A664 network, communication session data which is then received by an interface unit agent module on the A664 network. The interface unit agent module may be arranged to respond by sending data to the interface unit which configures the interface unit to operate in a specified way. Configuration files may for example be stored and maintained on the central computer and delivered to a newly installed interface unit. The interface unit may thus have a memory store in which data concerning the configuration of the interface unit are stored, defining for example the characteristics and input/output requirements of the transducer(s) connected to the unit.

Such a method may have benefits not only in efficiency of installation, but also in reducing certification of such a reconfigured aircraft. It may be that only the newly added parts need be certified for the aircraft to be declared operational. By way of contrast, when installing a new sensor or actuator on an existing aircraft it can prove necessary to reconfigure manually various parts of the avionics systems resulting in all such manually reconfigured parts needing to be re-certified, which can be time-consuming and administratively burdensome. It has been known for a small change in the avionics transducer set-up to required certification of not only the new transducers but also the associated parts of the A664 network including the associated remote data concentrator, and also the core processing module ("CPM"). The function of the interface unit agent module, particularly for example the operation of the plug and play method, may at least in part be performed by a proxy server, for example implemented in the same computing resource as the avionics computing resource. Such a proxy server may be configured to control at least part of the configuration of the interface unit, by means of A664 messages (e.g. AFDX messages) transmitted across the A664 network. The proxy server may for example function as the Smart Component Agent mentioned in further detail below. There may be a step of establishing a data-loading protocol. Such a communication protocol may comply with the Smart Component Communication Protocol (SCCP) described in further detail below. In certain embodiments of this method on adding a transducer to the A664 network, the interface unit performs a handshake with the interface unit agent module (e.g. on the central computer) and sets up a communications link and session and then downloads configuration data to the interface unit. Whilst the A664 network operates across multiple protocol layers including an application layer, such a handshake may effectively occur within the application layer. At least some of the communication, including for example the data-loading, is conducted according to a protocol in which there only sampling ports are used (no queuing ports).

The transducer(s) and the interface unit(s) referred to herein will typically be in the form of avionics Line Replaceable Unit ("LRU"s) loaded on the aircraft. There may also be application in relation to non-removable devices, for example where there are multiple instances of the same device.

There may be provided an embodiment which relates to a method of adding a transducer to an aircraft control system of an aircraft, the aircraft control system comprising a plurality of transducers connected via an A664 network to a central computer. Such a method may comprise a step of connecting a new transducer to the A664 network via an interface unit, the interface unit having a memory store in which data concerning the characteristics of the new transducer are stored. The interface unit may then send a message (perhaps multicasting or broadcasting such a message) that indicates that a new transducer has been added. An avionics, or other application, on the central computer may be looking (monitoring) for receipt of such a message, for example, have been prompted by user input. Such a method may comprise a step of the interface unit performing a handshake with the central computer. There then may be a step of transferring configuration files from the central computer to the interface unit, to configure the interface unit for operation in relation to the newly added transducer.

Some, of not all, of the above-described methods will be performed on an aircraft when on the ground (for example when in maintenance/testing/installation/reconfiguration and the like). It will be appreciated of course that the avionics system including its transducers will be used, in an operational mode, when the aircraft is being operated (for example, when taxiing, take-off, landing and general flight).

It may be that the communication across the network includes the sending of data packets, for example in the form of A664 messages (e.g. AFDX messages). It may be that all data fields in such messages are compliant with the A664 message format (e.g. the AFDX message format). The data packet (or A664 message or AFDX message) may include a MAC header (which may be in the data link layer of the standard OSI model). The data packet (or A664 message or AFDX message) may include an IP header. The data packet (or AFDX message) may include a UDP header (which can be deemed to be in the transport layer). The data packet (or A664 message or AFDX message) may include a check-sum (CRC). The data packet (or A664 message or AFDX message) may include, for example within its payload, an Application Level Integrity Checking mechanism. The data packet (or A664 message or AFDX message) may include, in its payload a special packet (named here for the sake of consistency with the embodiments described below with reference to the drawings as an "SCCP packet"). The SCCP packet may be fewer than 500 octets in length. The data packet (or A664 message or AFDX message) may include functional status data. The data packet (or A664 message or AFDX message) may include data concerning the mode of operation of the interface unit. The SCCP packet may facilitate, at least in part, communication between an interface unit and a corresponding interface unit agent module, in accordance with a protocol for that purpose, for example the SCCP protocol mentioned herein.

Embodiments are envisaged which provide an aircraft comprising an aircraft control system in accordance with any aspect of the present invention as claimed or described herein, including any optional features relating thereto. Embodiments are envisaged which provide an interface unit as configured for use as claimed or described herein including any optional features relating thereto when provided separately from the rest of the A664 network. The interface unit may optionally be configured for a certain use. The interface unit may optionally be provided with one or more transducers with which it is to be used.

Embodiments are envisaged which provide a computer, for example the CPM or part thereof, as configured for use as claimed or described herein including any optional features relating thereto. The computer may be provided separately from the rest of the A664 network and separately from the aircraft in which it is to be used. There are also provided related computer program products for programming with the local signal processing module of the interface unit of the present invention, as claimed or described herein including any optional features relating thereto, or for programming the central computer, for example to perform data-loading, configuration or interface unit agent module processes.

There now follows a description of specific embodiments, including the first and subsequent illustrated embodiments. FIG. 1 is a schematic diagram illustrating part of a first illustrated embodiment of the invention showing a "Smart Component" 10 connected to an avionics network 12. A central computer in the form of a Core Processing Module, or CPM, 14 (sometimes also referred to as a core processing cabinet) performs the function both of the CMS (Central Maintenance System) 16 and the DLCS (Data Loading and Configuration System) 18. The DLCS controls the downloading, managing and configuration of on-board applications software in the CPM. There exist separate partitions 20, 22 within the CPM, in accordance with the Avionics Application Standard Software Interface, ARINC 653, for hosting different software applications. One or more Avionics System Applications are provided within partition(s) 20. A given system application will provide the function and control, in software, that is associated with the transducers of a given avionics system. Separate partition(s) 22 is/are provided for those system services that manage and configure transducers when the aircraft is not in a normal operational mode and is, instead, in a maintenance mode. Such separate partition(s) 22, for example, include a BITE (Built-In Test Equipment) partition. An application for managing the smart components in such non-operational modes is included in such a separate partition(s) 22 and is referred to below as the Smart Component Agent.

An avionics data communication network is illustrated schematically by pipe 24. In this case the network and associated protocols are provided in accordance with ARINC 664 standard, part 7 (i.e. an "A664" network). The "A664" network may be in the form of Airbus' AFDX network. The A664 network is an avionics Ethernet-based network which utilises the concept of virtual links (see for example, U.S. Pat. No. 7,242,683). The "A664" network is typically a full-duplex network which is both deterministic and redundant. Whilst not shown in the Figures, the CPM 14 is connected to the A664 network 24 via an A664 network switch. Communication between the DLCS and CMS on the one hand and the system services applications in partition 22 on the other hand, via the A664 network, is shown schematically by means of arrows 28. The Smart Component 10 has the ability to communicate over a modified-A664 network, which may be in the form of a micro-AFDX network (but will be referred to hereafter as a micro-A664 network). A micro-switch unit 30 is provided for handling data transfer between the A664 network and the micro-A664 network. The Smart Component 10 acts as an intelligent interface unit between the micro-A664 network and one or more transducers (e.g. sensors or actuators), not shown in FIG. 1. Thus, the Smart Component is able to read sensor data from an analogue input and send them in an A664 message (e.g. an AFDX message) and to control an analogue actuator by outputting signals in accordance with commands received in an A664 message. With the use of such Smart Components, the aircraft's A664 network may effectively be operated as a native interface for the transducers, there effectively being direct communication between the avionics applications and their respective transducers. Direct operational control may be provided to the avionics applications, rendering the provision and use of a gateway (or additional router(s)) unnecessary.

As will be explained in further detail below, the Smart Component 10 has a configurable signal processing unit and local memory store. Communication between (a) the Smart Component 10 and (b) the avionics systems applications in partition 20 and the systems services applications in partition 22 of the CPM 14 across the A664 network, and via the switch unit 30, is illustrated by arrows 32 (and is provided by means of separate virtual links, as mentioned below). Each Smart Component is based on a generic, but configurable, piece of hardware that is small and located near its associated transducers, thus reducing the amount of cabling required to link transducers to the CPM 14. The generic Smart Component, once approved and certified for in-aircraft use, may be configured for use with different avionics transducers and with different avionics applications with relative ease. Many identically specified, but differently configured, Smart Components may be used on a single aircraft. Each Smart Component is able to connect to multiple transducers. The overall system is thus readily scalable, subject for example to the bandwidth capabilities of the A664 network.

Reducing the amount of electrical wiring required has many advantages. Simplified wiring results in fewer failure modes. Reducing the length of wiring reduces weight and simplifies wiring harnesses. Reducing the length of cabling for transmitting analogue electrical signals by means of introducing greater reliance on digital data cabling also has the benefit of digital data cabling requiring less in the way of EMI (electromagnetic interference) protection as compared to analogue signal cabling.

The use of generic Smart Components, instead of dedicated modules, also facilitates a reduction in part number count for an aircraft and also increases commonality of spares. The number of dedicated modules for specific inputs/outputs on the network may thus be reduced.

During normal operation of the aircraft (i.e. flight, take-off, landing, taxiing) transducers of the Smart Components 10 are controlled/monitored by means of avionics system applications (in partition 20) over the modified A664 network, with the Smart Components 10 each functioning in an operational mode. Each Smart Component 10 is also configured so as to be able to operate in a mode in which it dataloads firmware and configuration files (for network configuration, calibration, and the like for example) and to operate in a BITE mode for itself and the transducers connected to it.

The way in which the A664 network is used, and the Smart Components configured and operated, in the embodiments of the present invention (i.e. the protocols and standards adopted—see below for further details) provides a more robust arrangement than is typically provided in non-avionics environments operating transducers according to standards such as, for example, IEEE 1451. By way of example, IEEE 1451 is not a suitable standard for time critical Remote Terminal ("RT") operations. The IEEE 1451 standards, for example, require Transducer Electronic Data Sheets ("TEDS") to be stored in memory associated with each transducer, the TEDS detailing identification, calibration, and other data, in a network independent and highly flexible and configurable way. Such sophistication and flexibility is however difficult to integrate into a safety critical avionics environment, such as a Level A DAL system (as required by the presently illustrated embodiments). For example, IEEE 1451 has no native redundancy management features and no accepted standard for communication over an A664 network.

The NCAP (network capable application processor) proposed by IEEE 1451 is a gateway, whereas the networking philosophy adopted with the present embodiment seeks to avoid the use of such gateways. The IEEE 1451 standards also provide no distinction between a normal operational mode and a maintenance or testing mode.

Figure 2:
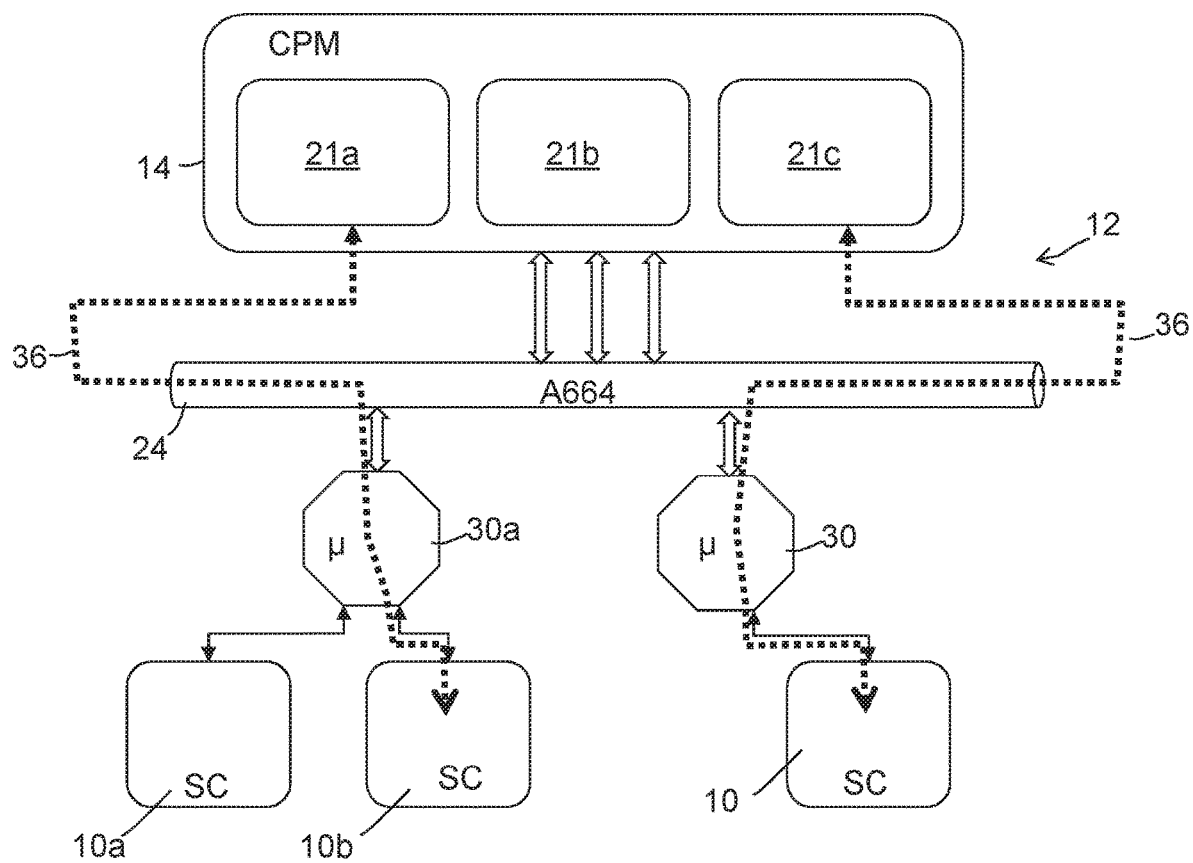
FIG. 2 shows the avionics network in use during operation of the aircraft.

FIG. 2 shows the Smart Component 10, the avionics network 12, and CPM 14 of FIG. 1 together with two further Smart Components 10a, 10b connected via a further network switch 30a. The network 12 is shown functioning in an operational mode. The CPM is running three separate avionics software applications illustrated schematically by means of boxes 21a, 21b, and 21c. A virtual communication channel ("virtual link") 36 extends, via the A664 network, between a single application 21a in the CPM 14 and a single Smart Component 10b providing the transducers for use by the application. Other transducers (not shown) may be connected, via the A664 network, to the CPM 14 by means of data concentrators (not shown) in a conventional manner.

Figure 3:
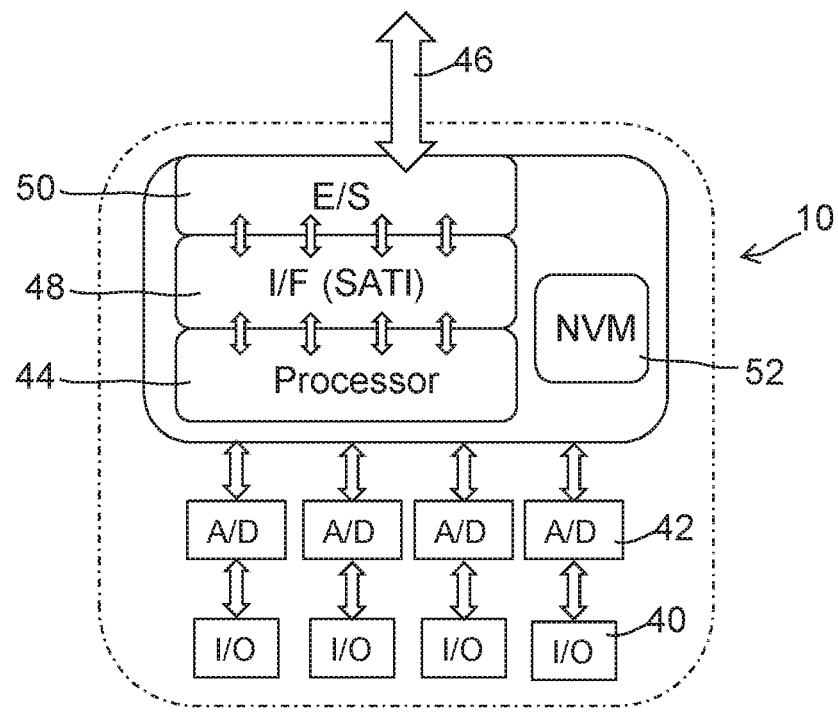
FIG. 3 shows the general structure of a generic "Smart Component" used in the network of the first embodiment.

FIG. 3 shows schematically the functionality of a generic Smart Component 10. Input/output ports 40 for connecting directly to respective transducers are each associated with a signal converter 42. For an output port, the signal converter will be a digital to analogue converter for converting digital commands into analogue signal outputs; whereas for an input port, the signal converter will be an analogue to digital converter for converting analogue signal inputs into digital form. It will be appreciated that fewer signal converters would be required were the input/output ports connected via a signal multiplexer (as envisaged in certain embodiments). The signal converters 42 are each connected, in the digital domain, to a signal processing unit 44, which in turn connects (arrow 46) to the A664 network via a Smart Avionics Transducer Interface module 48 ("SATI") and a micro-A664 end system (E/S) 50 (e.g. a micro-AFDX end system) including a network interface. A single chip accommodates the signal processing unit 44 and the hardware that provides the SATI function.

The micro-A664 end system (E/S) 50 provides native A664 communication, effectively providing a direct connection to the application in the CPM 14, there being no intervening gateway. Having such a set-up enables reduced latency and easier system integration. The processor 44 is associated with memory in the form of RAM (not shown) and a non-volatile memory ("NVM") unit 52, for storing data, such as configuration data for configuring the Smart Component, for data-logging and for storing maintenance/testing data. The NVM is thus configured to store locally files such as logbooks (for recording data of certain events for health monitoring). Files stored in the NVM of the smart components may have variable length and may log various data during operation of the aircraft that may need to be downloaded and analysed during routine maintenance of the aircraft (by means of dataloading operations, for example). The signal processing unit 44 local to the Smart Component also provides local processing resources for local control loops between an actuator connected to the Smart Component and associated sensors. For example, a single Smart Component can be connected to a smart fuel valve with motor-plus-position resolver. As another example, a THSA (Trimmable Horizontal Stabilizer Actuator) servo-valve could be connected to the same Smart Component as a position sensor control, providing a closed-loop control system.

Figure 4:
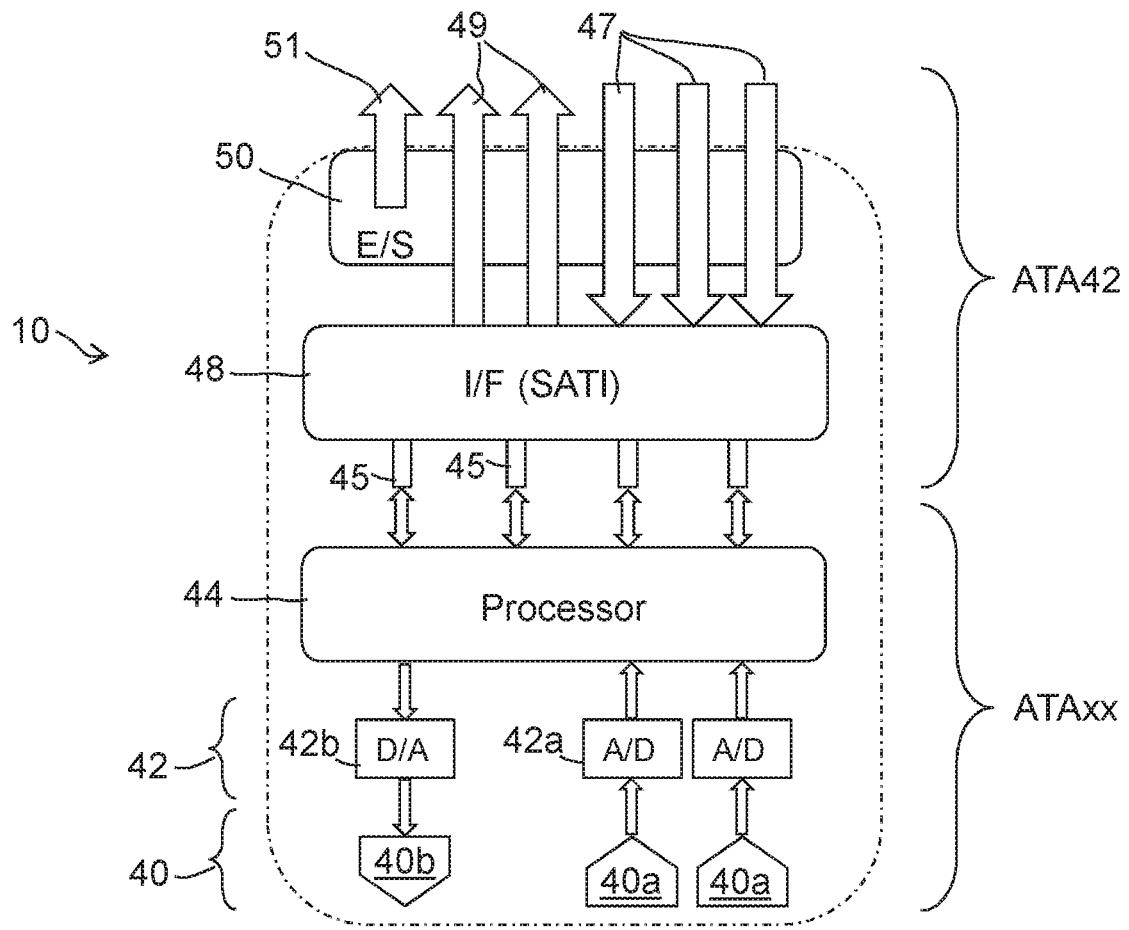
FIG. 4 shows the general structure of the "Smart Component" of FIG. 3 as used with specific outputs and inputs.

FIG. 4 shows, schematically, a Smart Component 10 (such as the one illustrated by FIG. 3) after having been configured to operate with a particular group of transducers, comprising two sensors 40a and a single actuator 40b. The two sensors 40a are connected to the processor 44 via two respective Analogue-to-Digital converters 42a. The single actuator 40b is connected to the processor 44 via a Digital-to-Analogue converter 42b. Separate transducer channels 45 (actually virtual channels) are illustrated schematically in FIG. 4 and provide the means for communication between the SATI module, via the processor 44, to the transducers 40. Each transducer channel has a corresponding configuration file stored in the Smart Component. Incoming commands (downloaded), whether from an avionics systems application or an application that functions in the non-operational mode (such as the Smart Component Agent) are schematically illustrated by arrows 47. Outgoing (uploaded) communication channels, whether for the communication of a response triggered by an incoming request or for sending other data, are schematically illustrated by arrows 49. Arrow 51 represents the communication channel for sending SNMP-compliant trap messages to the CPM 14. The (native) A664 End Station 50, the SATI module 48 and the transducer channels may be considered as belonging to the integrated avionics system ("ATA 42") of the aircraft and/or as providing the SATI interface, whereas the processor 44 (including its set-up/configuration) the converters 42 and the transducers 40 may be considered as belonging to a particular aircraft system ("ATAxx") and/or as providing the transducer module interface. (Those skilled in the art will appreciated that ATA is an acronym for "Air Transport Association" and that an ATAxx code, where xx is typically a two digit number, is the ATA code for a given avionics system.)

The Smart Component thus offers an A664 connection to operate analogue sensors and actuators (over "Transducer Channels"). Each Smart Component is dedicated to only one ATAxx system. As a consequence, the Smart Component is not a shared resource and contributes to perform a function inside the user system.

The ATAxx systems may be in the form of any of the following systems:
  Air Conditioning
  Communications
  Fire Protection
  Flight Control
  Fuel
  Ice & Rain Protection
  Landing Gears
  Navigation
  Oxygen
  Pneumatic
  Water Waste
  Inert Gas Generation System
  Auxiliary Power
  Cargo Compartment
  Doors Each ATAxx application, hosted on the CPM, has two principal ways to control the Smart Component, namely periodic commands to manage directly the Smart Component, during standard operations (in which the Smart Components is effectively directly managed by the appropriate ATAxx application), and aperiodic commands for other functionalities (such as, dataloading, BITE etc.).

Figure 5:
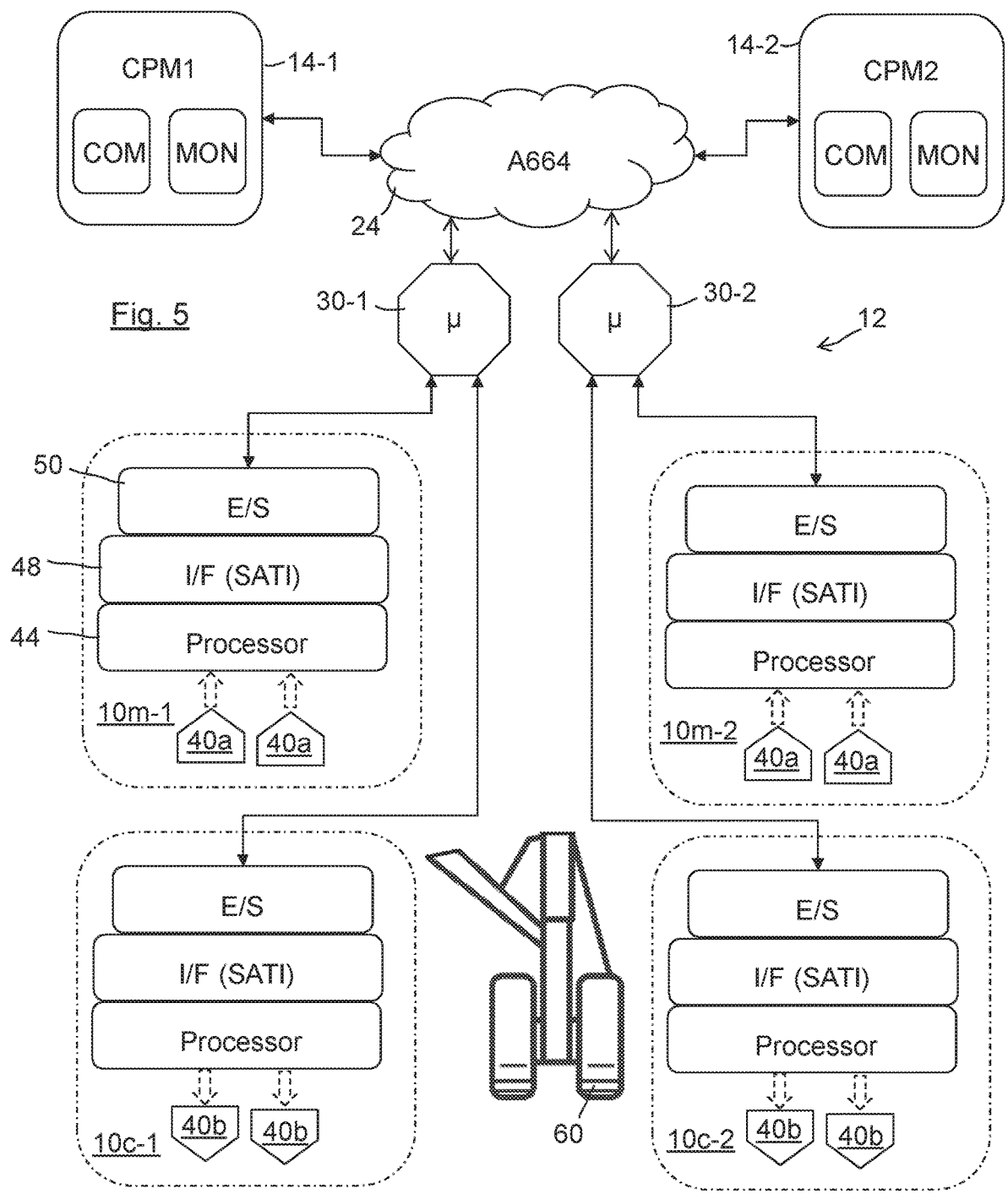
FIG. 5 shows part of the avionics network of the first embodiment used in relation to managing/controlling transducers associated with a landing gear with dual redundancy.

FIG. 5 shows an example installation showing the use of four Smart Components in a dual redundancy Landing Gear Monitoring System for a landing gear 60. Thus, there are two Core Processing Modules (CPMs), 14-1 and 14-2 which operate, as two independent sides of an avionics control system, across the avionics network 12. Each CPM 14 has a COM (command) module and a MON (monitoring) module and connects to associated Smart Components 10 via the A664 network 24. Four Smart Components are provided, two for each side, with each side having a Smart Component for responding to commands and a separate Smart Component for monitoring. Thus, a first side has a first Smart Component 10c-1 for responding to commands and a second Smart Component 10m-1 for monitoring and a second side has a third Smart Component 10c-2 for responding to commands and a fourth Smart Component 10m-2 for monitoring. Each side is connected via a respective switch unit 30-1, 30-2. The Smart Components 10m-1, 10m-2 for monitoring are associated with sensors 40a including an RVDT (Rotary Variable Differential Transformer) sensor. The Smart Components 10c-1, 10c-2 for commanding are associated with actuators 40b including relevant servo/selector valves. It will be appreciated that the sensors 40a and actuators 40b will be located on the landing gear, and that the drawing of FIG. 5 is schematic outlining the functional relations between the sensors 40a and actuators 40b and the rest of the Landing Gear Monitoring System and associated aircraft control system.

It will be seen that the Smart Components on both sides (side 1 and side 2) can be accessed by the Core Processing Modules (CPMs), 14-1 and 14-2 of both sides of Landing Gear Monitoring System application. The embodiment thus offer more modes of redundancy than other legacy systems can offer.

Figure 6:
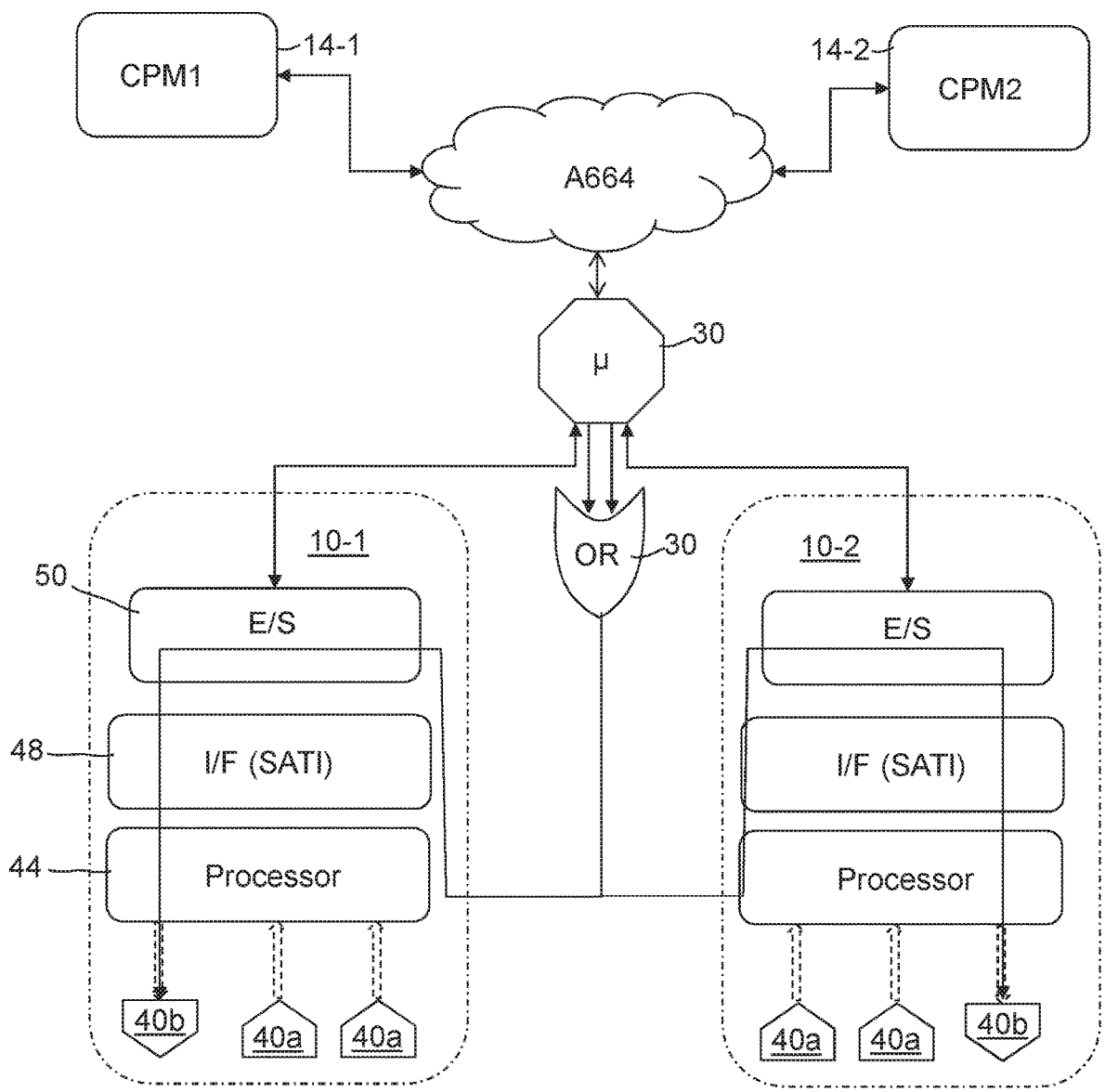
FIG. 6 shows part of a dual redundant avionics network featuring two smart components that share certain resources according to a second embodiment.

FIG. 6 shows a modified version of the system shown in FIG. 5, which forms the basis of a second illustrated embodiment. There is still dual redundancy, but in this case the Smart Components 10-1 and 10-2 of the two sides of the system, include an internal Wired-OR (represented by OR gate 62) which allows the Smart Components to share at least some of the same transducers. In this case one of the actuators 40b is shared between two Smart Components 10-1 and 10-2, as schematically represented in FIG. 6. An alternative, or additional arrangement, could provide that one of the analogue sensors is shared between two Smart Components 10-1 and 10-2, by an OR gate arrangement.

Figure 7:
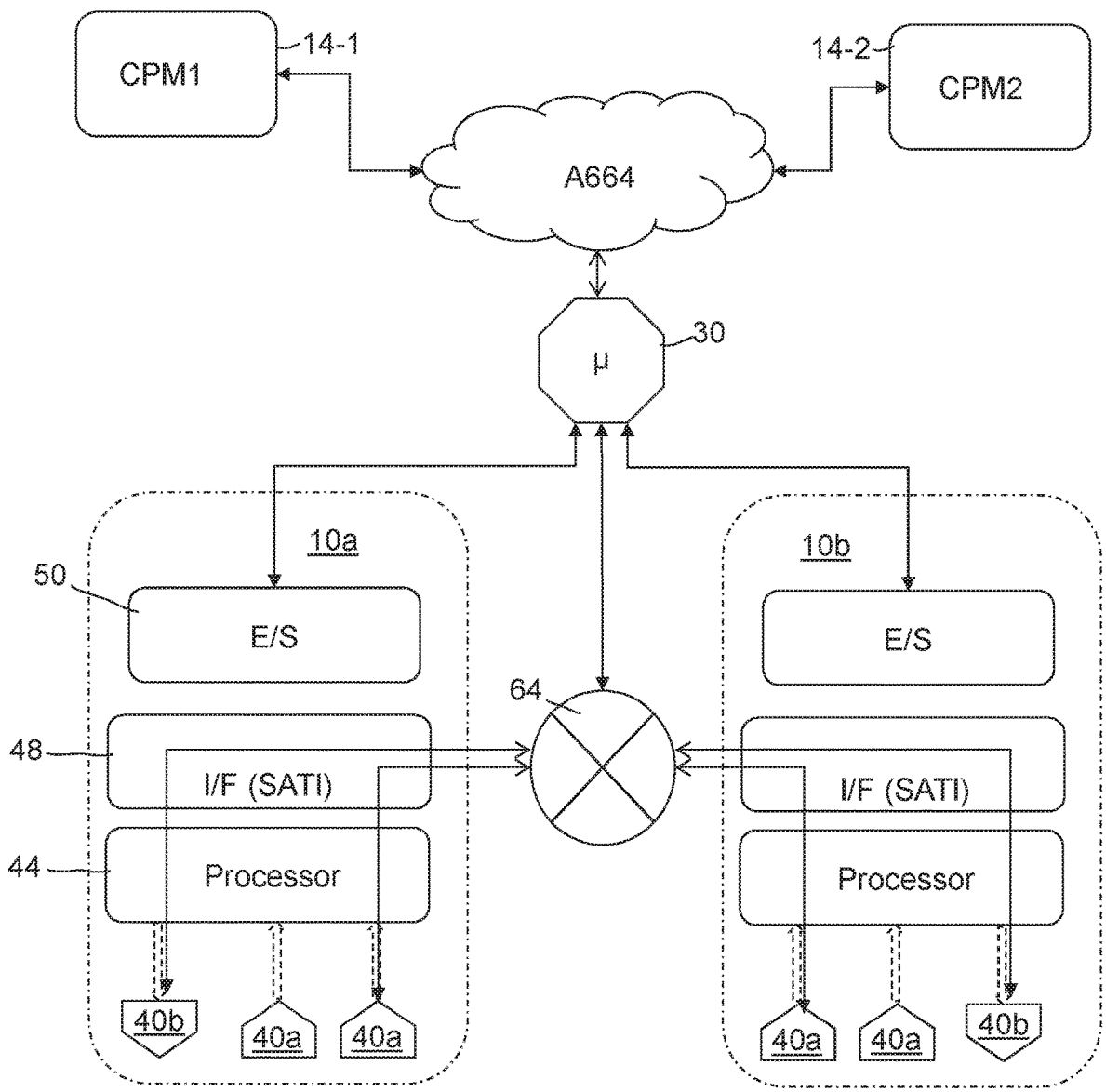
FIG. 7 shows part of a dual redundant avionics network featuring two smart components that combine certain resources according to a third embodiment.

A third illustrated embodiment is shown in FIG. 7 which is in the form of another modified version of the system shown in FIG. 5. There is still dual redundancy, but in this case the Smart Avionics Transducer Interface modules 48 of the Smart Components and the associated processing units are directly connected in a closed loop arrangement (schematically illustrated by connector 64) which allows the two Smart Components to interact and control the actuators 40b and sensors 40a connected to both Smart Components, with feedback between the respective Smart Components' transducers, without needing to rely on systems resources in the central processing module 14. A separate Virtual Link (VL) is provided to facilitate such functionality (e.g. including facilitating communication between the two Smart Components). Alternatively, discrete input/output ports could be specially provided to connect the two Smart Components for such communication between them, but that is not preferred as it would require extra wiring. Each Smart Component remains as a non-shared resource, because each Smart Component still operates as to be tied to a specific Domain or ATAxx Application, and no other. Thus, whilst shared resources would be shared between an ATAxx Application or between Domains, each Smart Component of the present embodiment is owned by a single specific Domain/ATAxx Application.

As mentioned above, the Smart Component is able to provide extra functionality in addition to facilitating communication and interfacing with transducers during operation of the aircraft. Such extra functionality includes providing additional services such as health monitoring Dataloading, and re-Calibration services.

Figure 8:
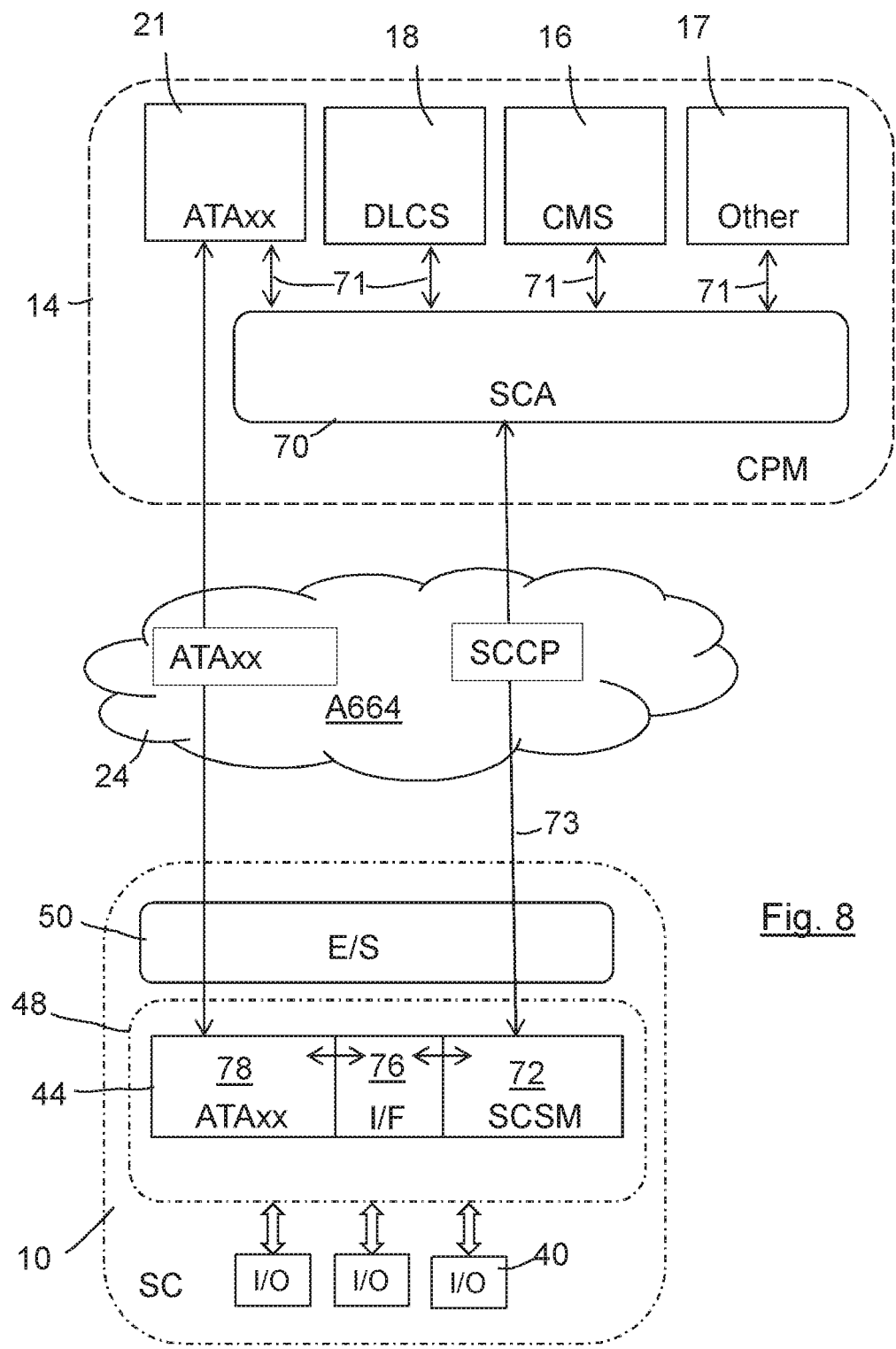
FIG. 8 shows the functional layout of a Smart Component Service Module ("SCSM") of the Smart Component of an embodiment of the invention.

Communication between the Smart Component 10 (of each of the first to third embodiments) and the CPM 14 is dictated by protocols implemented in software. In particular, within the CPM, there is provided Smart Component Agent software (residing within the separate partition 22 in the CPM that provides the system services), and within the Smart Component 10 there is provided a Smart Component Service Module ("SCSM"). A separate partition is provided within the CPM for the Smart Component Agent in view of safety and certification requirements, because the avionics systems applications have a higher DAL (Design Assurance Level) than the systems services applications. The functional layout is shown in FIG. 8. Thus, the Smart Component Agent ("SCA") 70 is embedded in the CPM 14 (in the form of a Line Replaceable Unit) and provides and manages the communication between the Smart Component 10 and the CPM 14, during non-operational modes, including for example communication to and from the Data Loading and Configuration System 18, the Central Maintenance System 16, and other bespoke maintenance applications 17. The SCA 70 is effectively provided in the form of a middleware interface between the System Services applications in the partition 22 and the Smart Component 10. In FIG. 8, the ATAxx applications are schematically represented by a single box 21. As best illustrated by FIG. 1, the ATAxx applications 21 are effectively a local client to the SCA 70 (in partition 22 in FIG. 1) and are in the same CPM as the SCA, whereas the Data Loading and Configuration System 18 and the Central Maintenance System 16 will typically be remote clients for the SCA 70 (not in the same CPM as the SCA). The SCA 70 can interface directly to local clients or interface to remote clients via the A664 network.

The avionics control system operates according to several policies/protocols/interfacing arrangements including:
 a Smart Component Communication Protocol (SCCP);
 an internal Smart Component Module Interface; and
 a Smart Component Agent Interface The SATI (the Smart Avionics Transducer Interface) 48 within the Smart Component 10 is correspondingly arranged to operate according to each of the three software parts/modules mentioned above. The SCCP defines an A664-based protocol that governs communication between a Smart Component Service Module 72 (embedded in the Smart Component 10) and the Smart Component Agent 70, for controlling aperiodic commands such as dataloading, BITE etc.).

The internal Smart Component Module Interface 76 provides an interface between the two principal modules embedded in the Smart Component 10, namely a Smart Component Service Module 72 and an ATAxx Processing Module 78. The Smart Component Agent Interface (not shown separately in FIG. 8) of the CPM 14 acts between the Smart Component Agent 70 and clients (e.g.: during Dataloading operations) which need to communicate with the Smart Component via the SCCP. In use, the Smart Component checks the arrival of requests from SCAs at defined polling frequencies.

The Smart Component Service Module 72 facilitates communication with the internal ATAxx Processing Module 78 (via the internal Smart Component Module Interface 76), communication with external clients (via the A664 network under the SCCP) such as the CMS (the Central Maintenance System) 16 and the DLCS (Data Loading and Configuration System) 18. The Smart Component Service Module 72 also facilitates the set-up, and take down, of communication between the ATAxx Processing Module 78, and ATAxx applications 21 during standard operation of the aircraft.

The small size of the Smart Component is partly enabled by means of not over-extending the electronic performance of the size Smart Component and instead making efficient use of chip space and processing power. Thus, the End System 50 is based on a modified A664 protocol (which may be referred to as a micro-A664 protocol or a µA664 protocol—e.g. micro AFDX) protocol. The End System may be a (µA664) micro E/S ("µE/S") or a (µA664) nano End System ("nE/S"). The main restrictions of such End Systems are as follows (VL="virtual link"):

| µE/S Characteristic | Reception | Transmission |
| --- | --- | --- |
| Max No. of VLs: | 120 | 15 (+1 for SNMP trap) |
| Max payload on VL: | 256 bytes | 256 bytes |
| Sub VLs permitted | No | No |
| Ports: | Queuing and Sampling | Queuing and Sampling |

The main restrictions of the nanoE/S definition are as follows:

| nanoE/S Characteristic | Reception | Transmission |
| --- | --- | --- |
| Max No. of VLs: | 8 | 4 (+1 for SNMP trap) |
| Max payload on VL: | 128 bytes | 128 bytes |
| Sub VLs permitted | No | No |
| Ports: | Sampling Only | Queuing of 1 element only |
| Input/Output Flow: | ≤1 frame per 62.5 µs | ≈1 frame per 500 µs |

The presently described embodiment primarily utilises the µA664 nanoE/S definition, which requires communication over sampling virtual links (not using the queuing virtual links). Dataloading, interactive BITE & configuration management services need to be handled despite such constraints.

In a standard A664 protocol, the communication port of the End System caters for queuing (in both receive and transmit mode) services and sampling (both receive and transmit) services, all being based on UDP (User Datagram Protocol). Briefly, sampling ports do not buffer beyond a single message (frame), such that previous messages (frames) are overwritten when a new message (frame) is received/sent. Thus, if the message (frame) is not actioned (retrieved) as appropriate in time (before a new message/frame takes its place), it is lost. A receive sampling port maintains a copy of the last message/frame received at the port. It can be sampled (retrieved) many times. A transmit sampling port continuously transmits (when so scheduled to do so) the current message/frame at the sampling port, until a new message/frame is placed at the sampling port for transmission. Queuing ports on the other hand maintain buffers of such messages/frames, as a first-in-first-out queue, so that no messages/data are overwritten/lost. Only when messages/data are appropriately actioned (retrieved/sent) are the messages/data removed from the buffer.

As mentioned above, the Smart Component Module Interface (SMI) is the interface between the SCSM (Smart Component Service Module) and the local ATAxx processing module in the Smart Component.

Data exchanged between the two modules include:
Mode setting (DataLoading and Maintenance)
User-defined SCCP (Smart Component Communication Protocol) messages
Software Pin Programming ("SPP")
Date and time information The Smart Component Module Interface (SMI) is able to set the mode of operation of the Smart Component, by means of communicating the mode as required by the ATAxx Processing Module to the Smart Component Service Module, and providing other information to the Smart Component Service Module as required under the Smart Component Communication Protocol ("SCCP").

As mentioned above, the Smart Component Agent Interface (SAI) (not shown in FIG. 8) is the interface between the Smart Component Agent (SCA) and local or remote clients, such as those that need to send requests to the Smart Component using the SCCP services. The SAI thus facilitates communication (arrows 71) with the CMS 16, the DLCS 18, ATAxx applications 21 and other clients 17. (It will be recalled that the CMS 16 and the DLCS 18 will typically be remote clients to the SCA and that at least some ATAxx applications 21 will be local clients to the SCA.) The SAI thus manages dataloading requests for the Smart Components and their associated transducers and interactive BITE (Built-In Test Equipment) requests to its Smart Components and associated transducers.

The Smart Component Communication Protocol (SCCP) is managed by the SCA (Smart Component Agent) and is the protocol which determines the control of a Smart Component and its associated transducers by means of aperiodic commands from the Smart Component Agent (SCA) thus facilitating functionalities such as dataloading and maintenance. It is the protocol that enables the different clients of the SCA to manage the Smart Component though asynchronous services. The protocol is configured to facilitate such functionalities despite the constraints of the µA664 nE/S. Such constraints include the fact that, effectively only sampling ports are available, and access to aircraft global information is limited/not possible. Legacy protocols for dataloading, BITE, SPP, and the like are unsuitable and so a new protocol is required. The principal issue to overcome is the limitation of only sampling ports being available. Sampling ports are designed to handle the periodical exchanges of data, for which loss of one value is not prejudicial for the receiving application and do not fit well with asynchronous operations (as required by dataloading and BITE), where the user wants to be sure that every packet is considered.

The main characteristics of the SCCP will now be described. SCCP services need a session to allow modification. Dataloading and BITE will be allowed only during their specific session safe condition. SCCP data are conveyed by means of limited length payloads over sampling Virtual Links, within the constraints imposed by the nA664/µA664 definitions.

Figure 13:
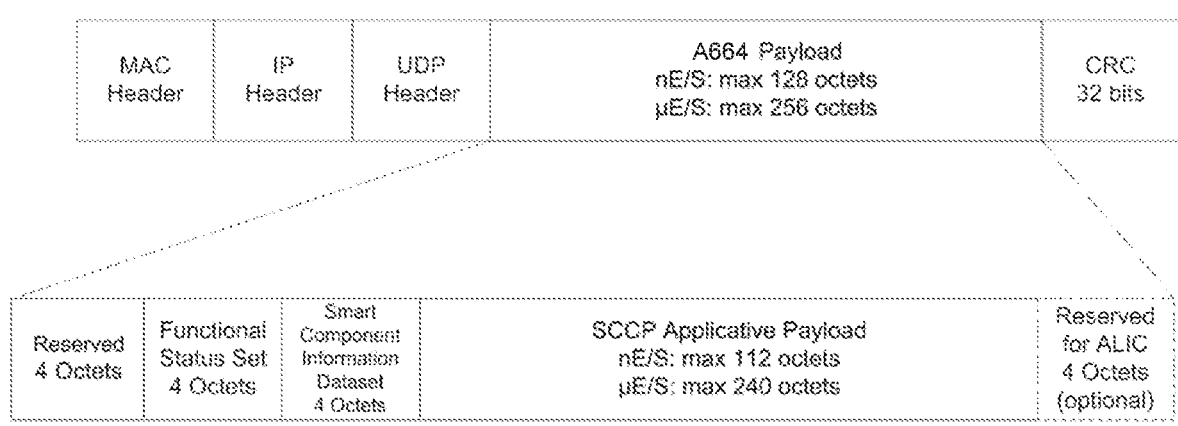
FIG. 13 is a representation of a data frame with a SCCP payload.

The data structure for packets will now be described. A schematic diagram illustrating the structure of the A664/SCCP packets and the SCCP payload is provided by FIG. 13. All data fields are compliant with A664 message formats (e.g. compliant with AFDX message formats). A SCCP packet, being complaint with such A664 message formats, will thus start with a MAC header (in the data link layer of the standard OSI model), followed by an IP header, and a UDP header (which can be deemed to be in the transport layer), then the A664 payload (e.g. the AFDX payload), and concluding with a check-sum (CRC). The A664 payload itself encapsulates the SCCP payload (with a nano-A664 end system, a maximum of 112 octets, but up to 240 octets with a micro-A664 end system), a payload being an integer multiple of 4 bytes. The SCCP payload may be considered as operating within one or more layers of the OSI model being above the transport layer.

The A664 payload has a 12-Octet long header section before the SCCP payload, comprising functional status data and Smart Component Information Dataset, which facilitates control of the mode of operation of the Smart Component. After the SCCP payload, the A664 payload includes an Application Level Integrity Checking mechanism. The SCCP Applicative Payload itself starts with a SCCP header which is composed of a Transaction ID to differentiate consecutive commands, an SCA ID to identify which SCA sent the command, a Protocol Version number identifying the protocol issue, a Transducer Address to identify which Transducer Channel of the Smart Component is concerned by the command, a Command ID to identify, in a command message, the command issued or, in a response message, the command status indicating if the command has successfully been completed or, if not, the error code returned. The use of a Transaction ID provides a sequence number thus allowing commands and responses to be dealt with sequentially, despite the use of a sampling port. A time stamp may also be used in combination with the sequence number in certain embodiments. The function facilitated by the Transaction ID may be considered as operating across the application layer of the standard OSI model.

The Modes of operation will now be described. The Smart Component needs to be able to switch safely between the various modes of operation, whether an ATAxx operational mode (in which the ATAxx applications are active), or a dataloading mode or a BITE testing/maintenance mode (in which the Smart Component Agent will be active). The dataloading mode and the BITE testing/maintenance mode are both only permitted when the ATAxx operational mode has been completed or is idle (i.e. when the aircraft is on ground).

The SCSM recognises and manages such switching between modes, including switching to a passive-DataLoading mode and a Maintenance mode. FIG. 8 also shows schematically the communication between the ATAxx applications 21 in the CPM and the ATAxx Processing Module 78 in the Smart Component, during standard operation of the aircraft, which is also facilitated by the Smart Component Service Module 72.

The Passive-DataLoading operation will now be described. The Passive-DataLoading mode allows all the dataloading operations on the Smart Component (part number collection, new software upload, and the like). Before dataloading operations can be commenced, the Smart Component Services Module needs both to be informed by the ATAxx application in the CPM that dataloading mode can be requested and for such a request to be made by the Smart Component Services Module 72. The first of these conditions is met by means of an authorisation message being sent from the ATAxx application in the CPM to the ATAxx Processing Module in the Smart Component 10, which then causes the appropriate flag to be set within the Smart Component Services Module 72. Only when the dataloading mode is so authorised, does the ATAxx Processing Module need to monitor for requests from the Smart Component Services Module to switch into the dataloading mode. The second of the two conditions is met by means of a request initiated by the Smart Component Agent 70 sending a request message to the Smart Component Services Module 72, which in turn requests the ATAxx Processing Module to initiate the switch the Smart Component into the dataloading mode. The instruction that effects the change into the Passive-DataLoading mode is then sent by the ATAxx Processing Module and received and actioned by the Smart Component Services Module. A response message indicating that the Smart Component has been set to the dataloading mode is sent from the Smart Component Services Module to the Smart Component Agent and data-loading operations may then be commenced. Once in the Passive-DataLoading mode, downloadable files are accessible in read/write operations.

The Maintenance mode will now be described. The Smart Component is also configured to operated, once so instructed to do so, in a Maintenance mode, in which mode prescribed maintenance operations may be performed on the Smart Component including interactive testing. The change of the Smart Component into the Maintenance mode needs to be both authorised by the ATAxx application and instructed by the ATAxx processing module in a manner similar to the switch to the data-loading mode as described above. Thus, the SCSM is arranged to send, when instructed by the Smart Component Agent to do so, a request to the ATAxx processing module to issue the instructions that causes the Smart Component to change into the Maintenance mode. Once in the Maintenance mode, files are accessible in accordance the test needs (which may be read-only or both read and write, for example).

Once in either the Passive-DataLoading mode or the Maintenance mode, a Smart Component can only leave mode by means of a reset or a power cycle. A "reset" is an optional action that is managed by the SCA in the CPM, whereas the performance of a "power cycle" is controlled and managed by ATAxx.

It may be that SCA redundancy is provided for reliability purposes, there being two (or more) SCAs that operate accordance with a Master/Slave notion.

The files structure of the Smart Component will now be described. The structure of the files stored within the memory of the Smart Component are, in this embodiment, required to have a special file format to allow the management of the files of a smart component using the SCCP over the micro-A664 network, where existing protocols such as, for example, the ARINC 615-A standard for dataloading operations, cannot be used for example due to the bandwidth restrictions required. Other file formats may exist alongside the special file format that will now be described. The same file format/structure is used for both the Transducers and for the Smart Component. Files will each have a header in which there is included a "File Access Code" providing a unique handler identifying the file in the Smart Component, a "File Size Indication" providing an indications of the total length of the file in bytes, a "Version Number" of the file, and a check-sum of the file. The File Access Code provides a unique identifier for each file held by the Smart Component or its Transducer to perform the different operations related to the management of the file system of the Smart Component. A file access code is only valid for a given transducer address: a file can belong either to the Smart Component itself or to a Transducer. (Each transducer in the network has a unique ID.)

The Smart Component may act as the interface between the A664 network and legacy equipment that is configured for operation over a Controller Area Network (CAN) data bus or an ARINC 429 field bus. In such a case, the file access code, identifying the main executable file, would either indicate the Smart Component's software when used in conjunction with the Smart Component's address, or a Transducer's one if used with a Transducer address. File Access Codes may also refer to other types of files, such as SCSM Configuration Files, File System Configuration Files, Network Configuration Files, and log books.

Figure 9:
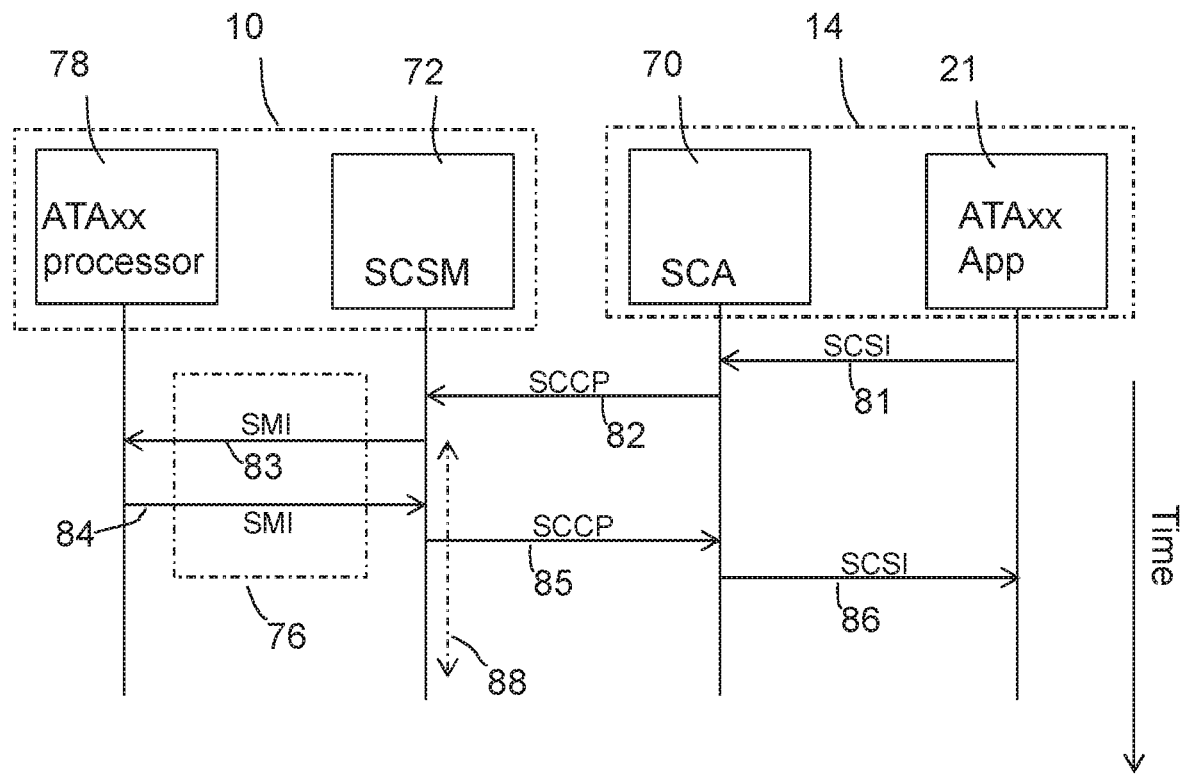
FIG. 9 shows how messages are communicated in accordance with a Smart Component Communication Protocol ("SCCP") used in the embodiments of the invention.

The request and response messages between SCA and SA via SCCP will now be described. As shown in FIG. 8, the SCSM 72 effectively has two interfaces, one (see arrow 73) with the SCA 70 in the CPM environment, through SCCP, used to control a Smart Component with aperiodic commands, and the other for facilitating communication with the local ATAxx processing module 78 in the Smart Component—i.e. via the Smart Component Module Interface (SMI) 76. When the ATAxx Application partition 20 on the CPM side needs to exchange aperiodic messages with the ATAxx Processing Module 78 on Smart Component side 10, SCCP is used thus enabling the aperiodic commands to be communicated over sampling ports (as required by the μA664 nE/S of the Smart Component 10). FIG. 9 shows an example of such an aperiodic message exchange between the ATAxx Application 21 in the CPM 14 and the ATAxx processing unit 78 in the Smart Component 10, the passage of time being represented in the vertical axis. The ATAxx App first issues a SCSI message 81 to the SCA 70. The SCA 70 then converts this into an SCCP request message 82 which is sent across the A664 network. The SCSM 72 receives this SCCP request message 82 from the SCA and issues an SMI request message 83 to the ATAxx processor 78 which responds with an SMI response 84. The SCSM 72 is then able to send an SCCP response message 85 to the SCA, which is received and converted into a SCSI response 86 for receipt by the ATAxx application 21. Thus, the SCSM (Smart Component Services Module) 72 is responsible for sending SCCP messages to the SCA which will then transmit to the ATAxx partition. The Smart Component 10 responds to, but does not initiate, SCCP exchanges. In use, the ATAxx Processing Module 78 regularly monitors a SCCP receive buffer for new messages from Smart Component Services Module 72. FIG. 9 also shows a time-out line 88 such that if the SCSM has not received the SMI response 84 within a pre-set length of time from sending the request 83, a time-out condition is declared.

Request (or command) messages from the SCA carry the service request/command parameters and other data including a flag (set by the master application) indicating when the Smart Component can accept a request from the master SCA to switch to a Maintenance mode or a passive DL mode, a flag (set by the SCA) indicating whether the SCA sending the message is assumed to be master or slave. Other data includes a transaction ID to differentiate between consecutive commands, an SCA ID to identify which SCA sent the command, a transducer address to identify which Transducer of the Smart Component is concerned by the command, a Command ID to identify the command. Command messages may be distinguished from request messages. The inclusion of a transaction ID is one of the ways in which the SCCP is able to be implemented over A664 VLs in sampling mode only. The same protocol message may need to be repeated several times before being acknowledged. The sending and receiving of messages between the SCA and the Smart Component is managed by setting up, holding and then terminating a session.

A response message to the SCA, from the Smart Component, acknowledging receipt of a request/command message includes data such as the Transaction ID value, so as to correlate the response to the request/command received, and a Command Status field to provide information on the execution of the command received including an indication on the success or failure (and reason) of the execution of the command. Response messages to the SCA also include flags indicating when the Smart Component is in maintenance mode, when the Smart Component is in passive data-loading mode, when a file is missing or invalid on the Smart Component, when the SCA is authorised to open a maintenance session or a dataloading session, when the Smart Component is ready to receive a new SCCP request (a "clear to send" flag) and conversely when the Smart Component has a "Command In Progress", and whether the SCA with which it is communicating is assumed to be master or slave.

Provision is made for the detection of the relevant SCA Master (and slave(s)) for the controlling application or the SCA when the Smart Component is used in a redundant architecture.

Provision is also made to accommodate and manage command timeouts, and retry messages. Each SCA implements and manages an expiration timer for each Smart Component controlled, which controls the validity period of a command sent to each such Smart Component. Each SCA also implements and manages a retry counter to manage the retry of a command already sent (but timed-out) to a Smart Component. After a threshold number of reties have failed, the SCA will deem the corresponding Smart Component as faulty and make no further attempts to send a command.

When a SCA has a command to send to a Smart Component, it checks the value of the "clear to send" flag as last received from the relevant Smart Component, and only sends the command if permitted to do so by the "clear to send" flag. When the Smart Component receives a command from the (master) SCA, it resets the "clear to send" flag (i.e. sets to "not clear to send"—command in progress), and processes the command as appropriate. After the command has been completed, the "clear to send" flag is set indicating that the Smart Component is ready to process a new command, allowing the SCA to send directly a new command as soon as it gets the response from the Smart Component. Subsequent commands are assigned new Transaction IDs.

Confirmation that a command has been successfully processed is indicated by the Smart Component in its response; otherwise, errors in communication are handled by the Smart Component by setting an appropriate error code in the SCCP Payload.

There are provided various services that can be exchanged over the SCCP between a controller, whether an ATAxx controller or a testing/maintenance controller (such as the Smart Component Agent), and a Smart Component, some of which services will now be described.

Session (operation mode) management is one such family of services, which includes (as described above) requesting that the Smart Component change into data loading mode or into maintenance mode.

Another family of services includes file transfer services (facilitating data-loading), such as services that allow the retrieval of information from on a file stored in the Smart Component (querying a file for example either to check the configuration of the Smart Component, or before uploading a file from the Smart Component so as to provide a datavalidation check that after the download has completed enables the SCA to check that the correct file has been downloaded in full), downloading (block by block) of a complete file from the Smart Component, managing the uploading of complete files to the Smart Component, and sending one or more blocks of data to the Smart Component. When uploading data onto the Smart Component, the SCA is arranged to reset the Smart Component or the Transducer after having uploaded all such data and updated each file, as appropriate, on the Smart Component. In order to efficiently transfer relatively big files to the Smart Component, whilst operating within the constraints imposed on the hardware and network performance, the SCCP requires that the SCA divides such (large) files into smaller "records" that are first transmitted into a buffer in the RAM of the Smart Component before being copied into the NVM at their final location. Data is transmitted in blocks, so the SCA is also responsible for fragmenting files/records into blocks so that the blocks can be transmitted one by one from the SCA to the Smart Component. The size of a record is dictated by the available size of the buffer available in the RAM of the Smart Component (buffer size being a figure between 2 kbytes and 32 kbytes), whereas the size of a block is determined by the available payload of a packet according to the SCCP (a figure between 100 and 150 bytes with nE/S, and a figure between 200 and 300 bytes with nE/S). The SCA is arranged to ensure that one file transfer operation is completed before another one is initialized. The Smart Component is arranged, by means of the SCSM, to send a message to the SCA on completion of the file transfer operation, or in the event of failure to complete the file transfer operation (error case). Similar management of messages is providing with the other file transfer services offered.

There are also configuration management services allowing the SCA to gather information from the Smart Component about its hardware configuration and to forward configuring information (such as software pin programming (SPP) values) to the Smart Component. In this embodiment, SPP values are sent by the SCA to Smart Component Services Module via SCCP and the Smart Component Services Module then sends them to the ATAxx Processing Module, which then uses the SPP values to configure the Smart Component. Configuration management services are authorised and set-up in a manner similar to that described above in relation to switching to the maintenance mode.

Also provided are maintenance services facilitating BITE interactive testing such as causing the Smart Component to run a Self-Test. The Smart Component is arranged to reply to a request to run a self-test by running the test requested, and if so performed, providing the results of the self-test in the response message. A response message may be sent before completion of the self-test to confirm that the Self-Test request is a "Command In Progress" if the self-test is still being executed.

The addition of a new Smart Component to an existing avionics network that is configured to accept such Smart Components may be managed by a "plug and play" philosophy. As Smart Components (when separated from the transducers and the network) are a generic piece of hardware with common software modules installed thereon, a Smart Component needs to be set-up or configured when connected to an avionics network to perform a certain function. A further embodiment of the invention will now be described illustrating a suitable method of setting up a generic Smart Component that is to be added to an existing avionics network and configured to perform a certain function.

Figure 10:
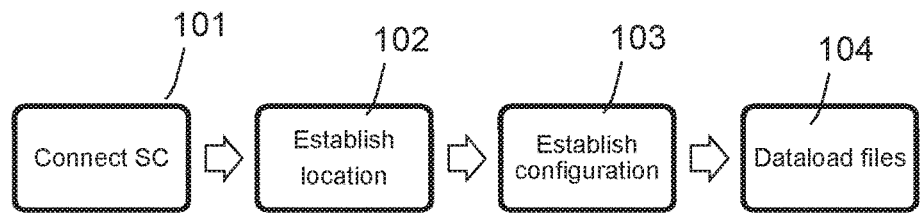
FIGS. 10 and 11 illustrate an embodiment of the invention in which a Smart Component utilises a plug and play methodology during initial installation.
Figure 11:
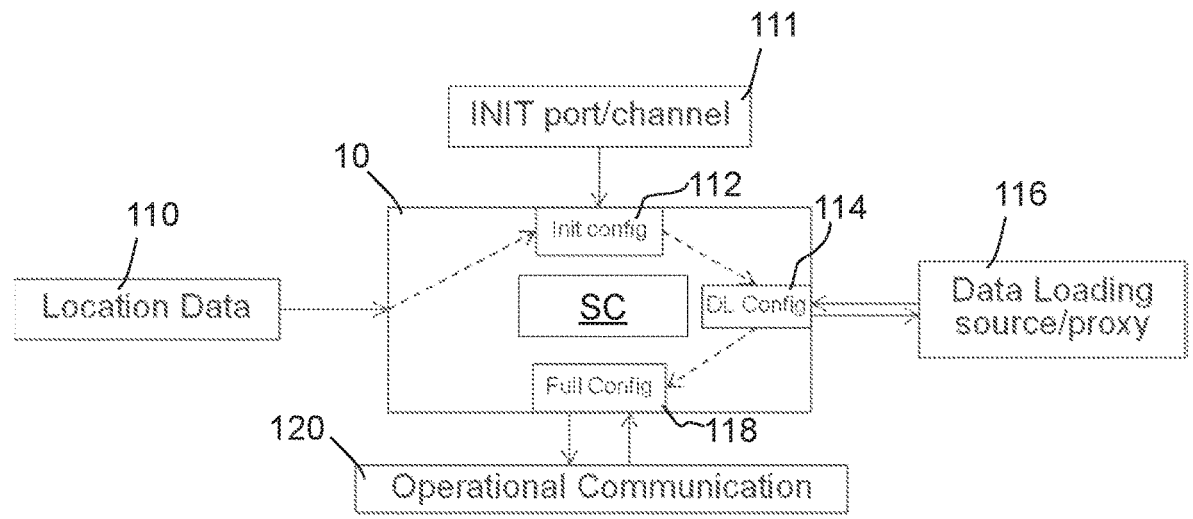

With reference to FIGS. 10 and 11, as a first step 101 a generic smart component 10 is placed in the desired physical location on the aircraft, connected to the associated transducers, and connected to the A664 network. The Smart Component is placed on the aircraft in non-configured state, to the extent that the Smart Component needs to be provided not only with operational configuration data, but also network and dataloading configuration data. The Smart Component has basic networking functionality pre-programmed on it, to allow initial communication across the A664 network, but up-to-date protocols, or protocols particularly suited to a specific role of the Smart Component, are not provided locally on the non-configured Smart Component and need to be loaded onto the Smart Component as part of the "plug and play" concept. The location of the smart component is established (step 102) using a data source (110) at the installed location, which in this embodiment is in the form of hardware pin programming (in which the location for the smart component is pre-set manually by means of setting a series of physical switches to positions that corresponding the appropriate code corresponding to the location). In other embodiments assigned network addresses may be used to relate to physical locations of smart components. The location information is transmitted to a plug-and-play controller (not shown) in the CPM which then establishes (step 103) the correct configuration for a Smart Component of the type that belongs at the location. A communication channel 111 is thus opened allowing for dataloading from the CPM and the Smart Component changes from an initial configuration mode 112 to a dataloading configuration mode 114. A dataloading protocol is thus established with the CPM. In the present embodiment, the DLCS (Data Loading and Configuration System) of the CPM is used to manage and set up the plug and play messages that pass between the CPM and the Smart Component.

Files are then transferred 104 via a dataload service from the configuration file store 116 of the CPM to the internal configuration files of the smart component. The Smart Component is then able to move from the dataloading configuration mode 114 to a fully configured mode 118 ready for operational communication 120, in which the loaded files are used to perform location specific operations.

The files loaded include various data. Such data typically includes data on the aircraft type, position specific network information, configuration tables, and up-to-date software for operations. Data may also include up-to-date networking/communications protocols and configuration data that enables the Smart Component to perform is role in relation to the transducers connected to it and the ATAxx application associated with it. Data may be encoded and/or compressed before being transmitted across the network. Such data encoding/compression may include defining of patterns, dedicated ranges, or constants in the network configuration. For example, the MAC address of the Smart Component may be deemed to be equal to a base MAC address plus an offset based on the position ID of the Smart Component. A global ID for a given file may be deemed to be equal to the position ID*100+an offset based on the local file ID (duplication of file IDs being avoided because it may be guaranteed that there are fewer than 100 local files).

In the present embodiment, the dataloading protocol uses one port/channel for two-way communication by means of using sequence numbers in the message payload, and appropriate hand-shaking, in a manner similar to that described above in relation to the SCCP protocol.

In the present embodiment, various standard file structures are used. The file store structure used in each Smart Component accommodates the following files:

An SCSM Configuration File defining various options/parameters.
A File System Configuration File
A Network configuration File (appropriate for the End System)
A part number hardware file
A Logbook for logging data during operation
Space for executable software and any other files that are needed for implementing the specific functions of the Smart Component The SCSM (Smart Component Services Module) Configuration Files comprise the following data:

Data to identify the file format version
Data concerning the configuration of transmission, comprising data defining in milliseconds the transmission period of CMD requests responses.
Data concerning the configuration of reception, comprising:
  Flags indicating whether or not reception of CMD requests from the SCAs are allowed (for both slave and master SCAs)
  Data defining the receive period in milliseconds for checking the arrival of CMD requests from the (respective) SCA(s)—the "polling frequency"
  Data defining the CMD refresh period in milliseconds of the time for which the data from the (respective) SCA(s) remains valid
Configuration data concerning the default SCA master and the timeout period in milliseconds before the system should use the default SCA master
Configuration data concerning the A664 Payload, comprising the A664 payload size in kBytes
Configuration data concerning of mandatory Time Outs for various SCCP Services
Configuration data concerning the transducers and their associated specifications comprising transducer IDs and timeout values.

As a variation on the above-described "plug and play" embodiment, a similar configuration process may be conducted when anew transducer is first connected to an (already configured and installed) Smart Component. In such a case, the Smart Component is arranged to multicast a message that indicates that a transducer has been newly connected to the Smart Component. The relevant avionics application may be "looking" for the transducer connected to the Smart Component already assigned to (and associated with) the application and/or for a non-assigned Smart Component with such a transducer, such that the Smart Component Agent is requested by the ATAxx application to monitor for such multicasted messages. Once a handshake operation has been conducted (so that the Smart Component is linked to the Smart Component Agent communicating on behalf of the relevant ATAxx application) the Smart Component Agent sends configuration and set-up data so that the Smart Component can be configured/re-configured as appropriate.

Figure 12:
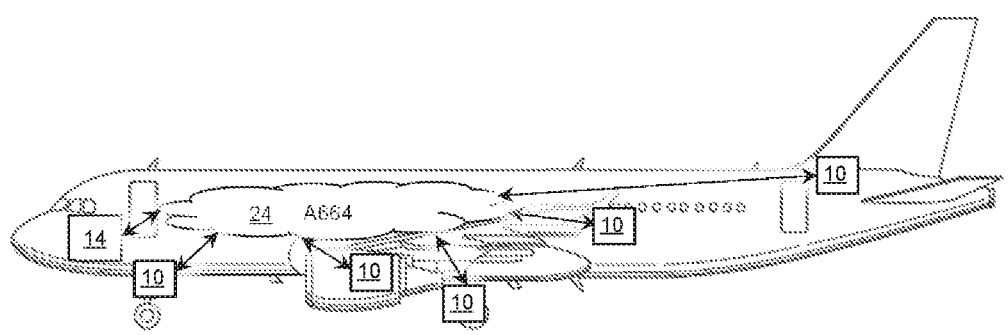
FIG. 12 is an aircraft incorporating an avionics network having multiple Smart Components 10.

A third embodiment of the invention is shown in FIG. 12, which illustrates an aircraft incorporating an avionics network where multiple Smart Components 10 are connected to the central processing module 14 via an A664-based protocol network 24. The aircraft sensors and actuators are substantially all connected digitally, by means of the Smart Components 10, to the central processing module 14.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

At least some of the analogue transducers may incorporate some form or signal processing, for example signal amplification or signal conversion components. Some of the transducers may thus produce signals that are more sophisticated than simple analogue signals. Such signals still require to be converted into A664 messages by the interface unit (e.g. Smart Components) to which the transducers are attached.

There may be multiple computing cabinets, each providing a partition, or part, or the CPM. The Smart Component Agent could be provided in separate hardware not forming part of a CPM. There may be use of the concepts embodied by the invention in the case where each Smart Component is connected (directly associated with) only one transducer. More transducers may be connected in other embodiments, as many as seventeen per Smart Component for example. Yet further capacity could be provided by means of signal/data multiplying transducer signals.

An IP address could be used to discover the location of the Smart Component on installation/initial configuration, instead of hard pin programming. Software pin programming could alternatively be used.

The hardware pin programming could be provided on data source preinstalled at the location and separate from the Smart Component, for example in the form of an RFID tag.

One or more Smart Components could be connected to the CPM via a μSwitch directly, and not via the A664 network. This is a special case and may be referred to as a Time Critical mode in μA664. In such a mode the CPM would take manage and control the associated network traffic shaping.

Whilst the above-described embodiments have particular application in relation to Airbus' "AFDX" networks, the invention may have application in relation to other avionics networks, not being in the form of an AFDX network. Such an avionics network may be a full duplex network. Such an avionics network may be a packet-based switched network. Such a network may have redundancy. Such an avionics network may have determined network access characteristics. Such an avionics network may have determined latency characteristics. Such an avionics network may have determined bandwidth characteristics. Such an avionics network may employ logical segregation of dataflows. Such an avionics network may be an Ethernet-based network (for example one based on the IEEE 802.3 standard).

Whilst mention is made above of the OSI model, it will be appreciated that embodiments of the present invention need not be fully compliant with the full 7-layer standard OSI communications network model.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A method of operating an aircraft control system on an aircraft, the aircraft control system comprising:
an aircraft central computer;
a smart component comprising an interface unit and a transducer directly connected to the interface unit; and
an avionics network connecting the central computer to the interface unit; the method comprising:
at the interface unit, determining an identifier of the smart component;
at the interface unit, transmitting over the avionics network the identifier to the aircraft central computer;
at the aircraft central computer, on the basis of the received identifier, determining configuration data suitable for the interface unit and transmitting over the avionics network the determined configuration data to the interface unit; and
at the interface unit, in response to receipt of the configuration data, configuring the interface unit to operate in accordance with the configuration data.

2. The method according to claim 1, wherein the configuration data comprises one or more of: data identifying a type of the aircraft, position specific network information, configuration tables, calibration data, network protocol updates, and software updates.

3. The method according to claim 1, wherein the configuration data comprises transducer configuration data,
wherein the step of configuring the interface unit comprises, on the basis of the transducer configuration data, configuring the interface unit to operate with the transducer.

4. The method according to claim 1, wherein the configuration data comprises calibration data for the transducer, wherein the step of configuring the interface unit comprises, on the basis of the calibration data, calibrating the transducer.

5. The method according to claim 1, wherein the configuration data comprises an updated network protocol,
wherein the step of configuring the interface unit comprises configuring the interface unit to communicate over the avionics network using the updated network protocol.

6. The method according to claim 5, wherein the steps of transmitting over the avionics network the identifier and the configuration data take place using a default network protocol, and the method further comprises the interface unit communicating over the avionics network using the updated network protocol, after the step of configuring the interface unit to operate in accordance with the configuration data is performed.

7. The method according to claim 1, wherein the identifier of the smart component is a position identifier comprising information relating to either or both of (a) a location on the aircraft and (b) a network address.

8. The method according to claim 7, wherein the step of determining the identifier of the smart component comprises evaluating an assigned network address of the interface unit.

9. The method according to claim 7, wherein the step of determining the identifier of the smart component comprises reading data identifying a location on the aircraft from a data source located at the same position on the aircraft as the interface unit.

10. The method according to claim 9, wherein the data source comprises hardware pin programming.

11. The method according to claim 1, wherein the interface unit comprises one or more manual switches,
wherein the step of determining the identifier of the smart component comprises evaluating the positions of the one or more manual switches.

12. The method according to claim 1, wherein the identifier of the smart component comprises an indication of the type of transducer connected to the interface unit.

13. The method according to claim 12, wherein the step of determining the identifier comprises the interface unit identifying the type of the connected transducer.

14. The method according to claim 1, wherein the aircraft control system comprises:
a further smart component comprising a further interface unit and a further transducer directly connected to the further interface unit, and the avionics network connects the aircraft central computer to the further interface unit,
wherein the method further comprises:
at the further interface unit, determining a further identifier of the further smart component on the aircraft;
at the further interface unit, transmitting over the avionics network the further identifier to the aircraft central computer;
at the aircraft central computer, on the basis of the received further identifier, determining further configuration data suitable for the further interface unit and transmitting over the avionics network the determined further configuration data to the further interface unit; and
at the further interface unit, in response to receipt of the further configuration data, configuring the further interface unit to operate in accordance with the further configuration data.

15. The method according to claim 14, wherein the interface unit and the further interface unit have identical hardware.

16. The method according to claim 14, wherein the transducer is of a different type to that of the further transducer.

17. The method according to claim 1, wherein the interface unit is directly connected to the transducer on the aircraft.

18. The method according to claim 1, further comprising:
at the interface unit, receiving over the avionics network a signal intended for the transducer;
in response to receipt of the signal, converting the signal from a form suitable for transmission over the avionics network to one suitable for transmission to the transducer; and
transmitting the converted signal to the transducer.

19. The method according to claim 1, further comprising:

at the interface unit, receiving from the transducer a signal;

the interface unit converting the signal from the transducer into a form suitable for transmission over the avionics network; and transmitting the converted signal via the avionics network to the aircraft central computer.

20. The method according to claim 1, wherein the smart component is in the form of a line replaceable unit.

21. An aircraft control system for an aircraft comprising:
an aircraft central computer;
a smart component comprising an interface unit and a transducer directly connected to the interface unit; and
an avionics network, connecting the central computer to the interface unit;
wherein:
the interface unit is configured to determine an identifier of the smart component on the aircraft and transmit over the avionics network the determined identifier to the aircraft central computer;
the aircraft central computer is configured to, on the basis of the received identifier, determine configuration data suitable for the interface unit and transmit over the avionics network the determined configuration data to the interface unit; and
the interface unit is configured to, in response to receipt of the configuration data, configure the interface unit to operate in accordance with the configuration data.

22. A line replaceable unit for integrating in an avionics network of an aircraft control system for an aircraft, wherein:
the line replaceable unit is a smart component comprising an interface unit and one or more transducers;
the interface unit is configurable for use in different avionics applications;
the interface unit includes a local signal processing module arranged to receive signals from and to transmit signals to the one or more transducers directly connected to the interface unit;
the smart component includes a local memory associated with the local signal processing module;
the local signal processing module of the interface unit is arranged to convert between such signals to/from the transducer and digital signals in a form suitable for transmission over the avionics network, thus providing a communications link between the one or more transducers directly connected to the unit and the avionics network;
the smart component has a specific role which corresponds to the type(s) and physical location(s) of the transducers of the smart component when on the aircraft;
the smart component has a non-configured state in which the configuration data and/or protocols that correspond to the specific role of the smart component are not loaded into the local memory and a configured state in which such configuration data and/or protocols are loaded into the local memory; and
the smart component is arranged so that when placed on the aircraft in a non-configured state the smart component automatically communicates across the avionics network in order to load onto the interface unit the configuration data and/or protocols that correspond to the specific role of the smart component.

* * * * *